US010890164B2

(12) United States Patent
Smith et al.

(10) Patent No.: US 10,890,164 B2
(45) Date of Patent: Jan. 12, 2021

(54) SYSTEMS AND METHODS FOR REMOTELY MANAGING WIND POWER GENERATION

(71) Applicant: EC&R Services, LLC, Chicago, IL (US)

(72) Inventors: Delaney Smith, Austin, TX (US); Harry Sawyer, Austin, TX (US); Rogers Whittle, Austin, TX (US); Jeremiah Belanger, Austin, TX (US)

(73) Assignee: EC&R Services, LLC, Chicago, IL (US)

( * ) Notice: Subject to any disclaimer, the term of this patent is extended or adjusted under 35 U.S.C. 154(b) by 0 days.

(21) Appl. No.: 16/156,502

(22) Filed: Oct. 10, 2018

(65) Prior Publication Data

US 2019/0113024 A1  Apr. 18, 2019

Related U.S. Application Data

(60) Provisional application No. 62/572,433, filed on Oct. 14, 2017.

(51) Int. Cl.
*F03D 17/00* (2016.01)
*F03D 80/50* (2016.01)
*F03D 7/04* (2006.01)
*F03D 7/00* (2006.01)
(Continued)

(52) U.S. Cl.
CPC .............. *F03D 17/00* (2016.05); *F03D 7/00* (2013.01); *F03D 7/047* (2013.01); *F03D 7/048* (2013.01); *F03D 80/50* (2016.05); *G05B 19/0428* (2013.01); *F03D 7/026* (2013.01); *F05B 2220/30* (2013.01); *F05B 2260/80* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,734,255 A * | 3/1998 | Thompson | H02J 3/38 290/2 |
| 6,392,312 B1 * | 5/2002 | Morris | F02N 11/0807 123/179.2 |
| 9,111,405 B2 | 8/2015 | Barragan et al. | |

(Continued)

FOREIGN PATENT DOCUMENTS

| | | |
|---|---|---|
| EP | 2725745 | 4/2014 |
| WO | 2014153673 | 10/2014 |

OTHER PUBLICATIONS

International Searching Authority, Notification of Transmittal of the International Search Report and the Written Opinion of the International Searching Authority dated Jan. 30, 2019, in International application No. PCT/US2018/055148, 18 pages.

(Continued)

*Primary Examiner* — Rocio Del Mar Perez-Velez
*Assistant Examiner* — Hung H Dang
(74) *Attorney, Agent, or Firm* — Trop, Pruner & Hu, P.C.

(57) ABSTRACT

An embodiment provides controllers modules that allow for an energy generation module, such as a wind turbine, to be restarted locally and remotely. To restart the energy generation module remotely, care is taken to ensure the module is not in lock down mode. Further, the adding the ability to remotely restart the module does not alter the code or logic used to locally restart the module. Other embodiments are described herein.

21 Claims, 14 Drawing Sheets

(51) Int. Cl.
    *G05B 19/042*     (2006.01)
    *F03D 7/02*     (2006.01)

(52) U.S. Cl.
    CPC .. *F05B 2270/10* (2013.01); *G05B 2219/2619* (2013.01)

(56) References Cited

U.S. PATENT DOCUMENTS

| | | | |
|---|---|---|---|
| 2004/0230377 A1 | 11/2004 | Ghosh et al. | |
| 2009/0204266 A1 | 8/2009 | Lovmand et al. | |
| 2010/0135788 A1 | 6/2010 | Qu | |
| 2012/0066544 A1* | 3/2012 | Ichinose | H04L 41/0663 714/4.12 |
| 2012/0166000 A1* | 6/2012 | Ellena | G05B 19/042 700/287 |
| 2013/0211611 A1* | 8/2013 | Ahrensbach | F03D 7/047 700/287 |
| 2016/0115942 A1* | 4/2016 | Noto | F03D 7/048 290/44 |
| 2016/0327025 A1* | 11/2016 | Noto | F03D 7/047 |

OTHER PUBLICATIONS

Wikipedia, "SCADA", Jul. 7, 2017, 11 pages, https://en.wikipedia.org/wiki/SCADA.
Wikipedia, "Relay", Sep. 20, 2017, 15 pages, https://en.wikipedia.org/wiki/Relay.
Wikipedia, "Distributed control system", Jul. 19, 2017, 8 pages, https://en.wikipedia.org/wiki/Distributed_control_system.
Wikipedia, "Galvanic isolation", Mar. 8, 2018, 2 pages, https://en.wikipedia.org/wiki/Galvanic_isolation.
GE Renewable Energy, "Technical Documentation Wind Turbine Generator Systems 3.8-130-50/60 Hz", 2016, 13 pages, General Electric Company, https://www.provinciegroningen.nl/fileadmin/user_upload/Documenten_2017/Downloads/Informatieblad-General-Electric-uitbreiding-Windpark-Delfzijl-Zuid.pdf.
"Glossary of Terms Lockout Tagout", 29 CFR 1910.147, 2 pages.

* cited by examiner

|  | 11.4 MW |
|---|---|
| 1. Double Click Turbine Name in Right Box: | |
| 2. Turbine Number: 151<br>   Feedback: 151    F7 | |
| 3. Click to turn ON Control En: | ☐ OFF |
| 4. Select Command to Send: | Ready |
|    Click to Send Command: | ☐ |
|    Feeback of Command Sent: | NO_CMD_Requested |

FIG. 7

| ☐ A1 | ☐ B13 | ☐ C13 | ☐ D14 | ☐ F1 |
|---|---|---|---|---|
| ☐ A2 | ☐ B14 | ☐ C14 | ☐ D15 | ☐ F2 |
| ☐ A3 | ☐ B15 | ☐ C15 | ☐ D16 | ☐ F3 |
| ☐ A4 | ☐ B16 | ☐ C16 | ☐ D17 | ☐ F4 |
| ☐ A5 | ☐ B17 | ☐ C17 | ☐ D18 | ☐ F5 |
| ☐ A6 | ☐ B18 | ☐ C18 | ☐ D19 | ☐ F6 |
| ☐ A7 | ☐ B19 | ☐ C19 | ☐ E1 | ☐ F7 |
| ▨ A8 | ☐ B20 | ☐ C20 | ☐ E2 | ▨ F8 |
| ☐ A9 | ☐ B21 | ☐ C21 | ☐ E3 | ☐ F9 |
| ☐ A10 | ☐ B22 | ☐ C22 | ☐ E4 | ☐ F10 |
| ☐ A11 | ☐ B23 | ☐ C23 | ☐ E5 | ☐ F11 |
| ☐ A12 | ☐ B24 | ☐ C24 | ☐ E6 | ☐ F12 |
| ☐ A13 | ▨ B25 | ☐ C25 | ☐ E7 | ☐ F13 |
| ☐ A14 | ☐ B26 | ☐ C26 | ☐ E8 | ☐ F14 |
| ☐ A15 | ☐ B27 | ☐ C27 | ☐ E9 | ☐ F15 |
| ☐ A16 | ☐ B28 | ☐ C28 | ☐ E10 | ☐ F16 |
| ☐ A17 | ☐ B29 | ☐ C29 | ☐ E11 | ☐ F17 |
| ☐ A18 | ☐ B30 | ☐ C30 | ☐ E12 | ☐ F18 |
| ☐ A19 | ☐ B31 | ☐ C31 | ☐ E13 | ☐ F19 |
| ☐ A20 | ☐ B32 | ☐ C32 | ☐ E14 | ☐ F20 |
| ☐ A21 | ☐ B33 | ☐ C33 | ☐ E15 | ☐ F21 |
| ☐ A22 | ☐ B34 | ☐ C34 | ☐ E16 | ☐ F22 |
| ☐ A23 | ☐ B35 | ☐ C35 | ☐ E17 | ☐ F23 |
| ☐ A24 | ☐ B36 | ☐ D1 | ☐ E18 | ☐ F24 |
| ☐ B1 | ☐ C1 | ☐ D2 | ☐ E19 | ☐ F25 |
| ☐ B2 | ☐ C2 | ☐ D3 | ☐ E20 | ☐ F26 |
| ☐ B3 | ☐ C3 | ☐ D4 | ☐ E21 | ☐ F27 |
| ☐ B4 | ☐ C4 | ☐ D5 | ☐ E22 | ☐ F28 |
| ☐ B5 | ☐ C5 | ☐ D6 | ☐ E23 | |
| ☐ B6 | ☐ C6 | ☐ D7 | ☐ E24 | |
| ☐ B7 | ▨ C7 | ☐ D8 | ☐ E25 | |
| ☐ B8 | ☐ C8 | ☐ D9 | ☐ E26 | |
| ☐ B9 | ☐ C9 | ▨ D10 | ☐ E27 | |
| ☐ B10 | ☐ C10 | ☐ D11 | ☐ E28 | |
| ☐ B11 | ☐ C11 | ☐ D12 | ☐ E29 | |
| ☐ B12 | ☐ C12 | ☐ D13 | ☐ E30 | |

FIG. 8

| States Table | | | | |
|---|---|---|---|---|
| ◀◀ ◀◀ ◀ | | 293 | ▶ ▶▶ ▶▶| | |
| State | Name | Color | Line Style | Line Wid |
|  |  | 0 | None ▽ | 0 |
| 0 |  | 3 | None ▽ | 0 |
| 1 | Reset | 13 | None ▽ | 0 |
| 2 | Start | 13 | None ▽ | 0 |
| 3 | Stop | 13 | None ▽ | 0 |
| 4 | HRC Stop/Reset | 13 | None ▽ | 0 |
| 5 | HRC Start | 13 | None ▽ | 0 |
| 6 | HRC Stop/Reset Start | 13 | None ▽ | 0 |
| 7 |  | 0 | None ▽ | 0 |
| 8 |  | 0 | None ▽ | 0 |
| 9 |  | 0 | None ▽ | 0 |
| 10 |  | 0 | None ▽ | 0 |
| 11 |  | 0 | None ▽ | 0 |
| 12 |  | 0 | None ▽ | 0 |
| 13 |  | 0 | None ▽ | 0 |
| 14 |  | 0 | None ▽ | 0 |
| 15 |  | 0 | None ▽ | 0 |
| 16 |  | 0 | None ▽ | 0 |
| 17 |  | 0 | None ▽ | 0 |
| 18 |  | 0 | None ▽ | 0 |
| 19 |  | 0 | None ▽ | 0 |
| 20 |  | 0 | None ▽ | 0 |
| 21 |  | 0 | None ▽ | 0 |
| 22 |  | 0 | None ▽ | 0 |
| 23 |  | 0 | None ▽ | 0 |
| 24 |  | 0 | None ▽ | 0 |
| 25 |  | 0 | None ▽ | 0 |
| 26 |  | 0 | None ▽ | 0 |
| 27 |  | 0 | None ▽ | 0 |
| 28 |  | 0 | None ▽ | 0 |
| 29 |  | 0 | None ▽ | 0 |
| 30 |  | 0 | None ▽ | 0 |
| 31 |  | 0 | None ▽ | 0 |
| 32 |  | 0 | None ▽ | 0 |

FIG. 9

Mechanical Isolation
Magnetic Field Isolation
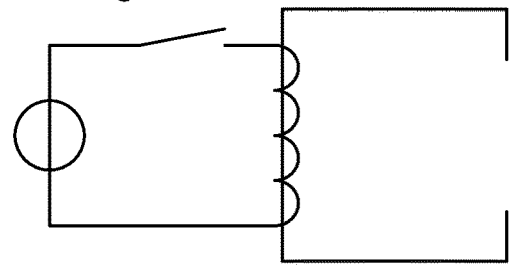
Opto-Electronic Isolation
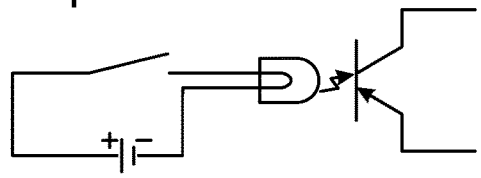
Radio Isolation
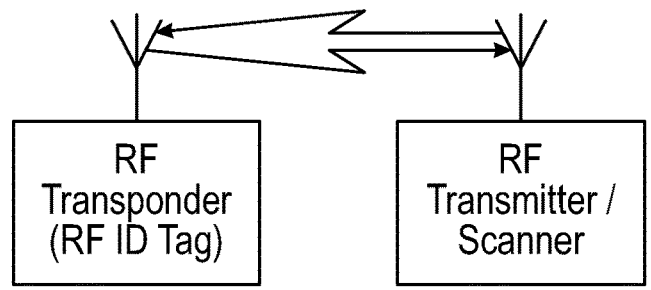
Non-Contact Sensor Isolation
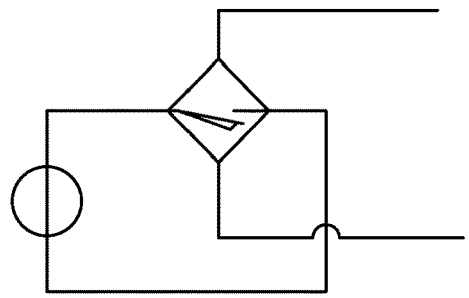
Magnetic, Eddy Current, Hall Effect, etc.
FIG. 13

SYSTEMS AND METHODS FOR REMOTELY MANAGING WIND POWER GENERATION

PRIORITY

This application claims priority to U.S. Provisional Patent Application No. 62/572,433 filed Oct. 14, 2017, and entitled "Systems and Methods for Remotely Managing Wind Power Generation". The content of the above application is hereby incorporated by reference.

TECHNICAL FIELD

Embodiments of the invention are in the field of wind power generation management.

BACKGROUND

A wind farm may include hundreds of wind turbines that collectively provide a capacity of hundreds of megawatts. Some wind turbines are installed far from human operators and monitored remotely. As a result, turbines that are in some form of error or fail state may be many miles away from the technicians that can restore them to normal operation. Further, the turbines may fail when personnel are off-duty and unavailable to service the turbine regardless of their proximity to the turbine. Loss of normal machine operation under these or similar circumstances results in reduced production efficiency and, in the case of wind turbines, unrecoverable revenue losses.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 6, 7, 8, and 9 depict human machine interfaces in embodiments.

FIG. 13 depicts various hardware switches used in embodiments described herein.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

Some turbines are designed to only allow local interventions (i.e., from a technician present at the turbine). Applicant determined this is highly problematic in situations such as, for example, when there is sufficient machine status information for the turbine such that an operator (who may be located remotely from the problematic turbine) could determine remote restoration of normal operation for the turbine poses an acceptable risk.

To remedy this and related issues, embodiments provide remote restoration of normal machine operation. Embodiments enable functions to be performed on the machines (e.g., turbines), wherein such functions originate or are communicated from a human-machine interface (HMI) (e.g., a graphical user interface (GUI)) located remotely from the machine. The functions are then communicated to: (a) a local intervention controller (LIC) installed in or near the machine, and/or (b) communication/monitoring software on a server coupled to the LIC. This communication and enablement of functions is performed without performing modifications to control logic supplied with the machine. For example, the use of an embodiment described herein (e.g., a LIC) may be implemented without having to alter the hardware or software for a controller (from a vendor for the turbine) for the turbine. This allows a party to "retrofit" a turbine for remote intervention (e.g., restarting a turbine that stopped for some reason) when the logic (e.g., see element 513 in FIG. 5) for that turbine does not provide for such a function—all without modifying the logic for that turbine.

Figure 1:
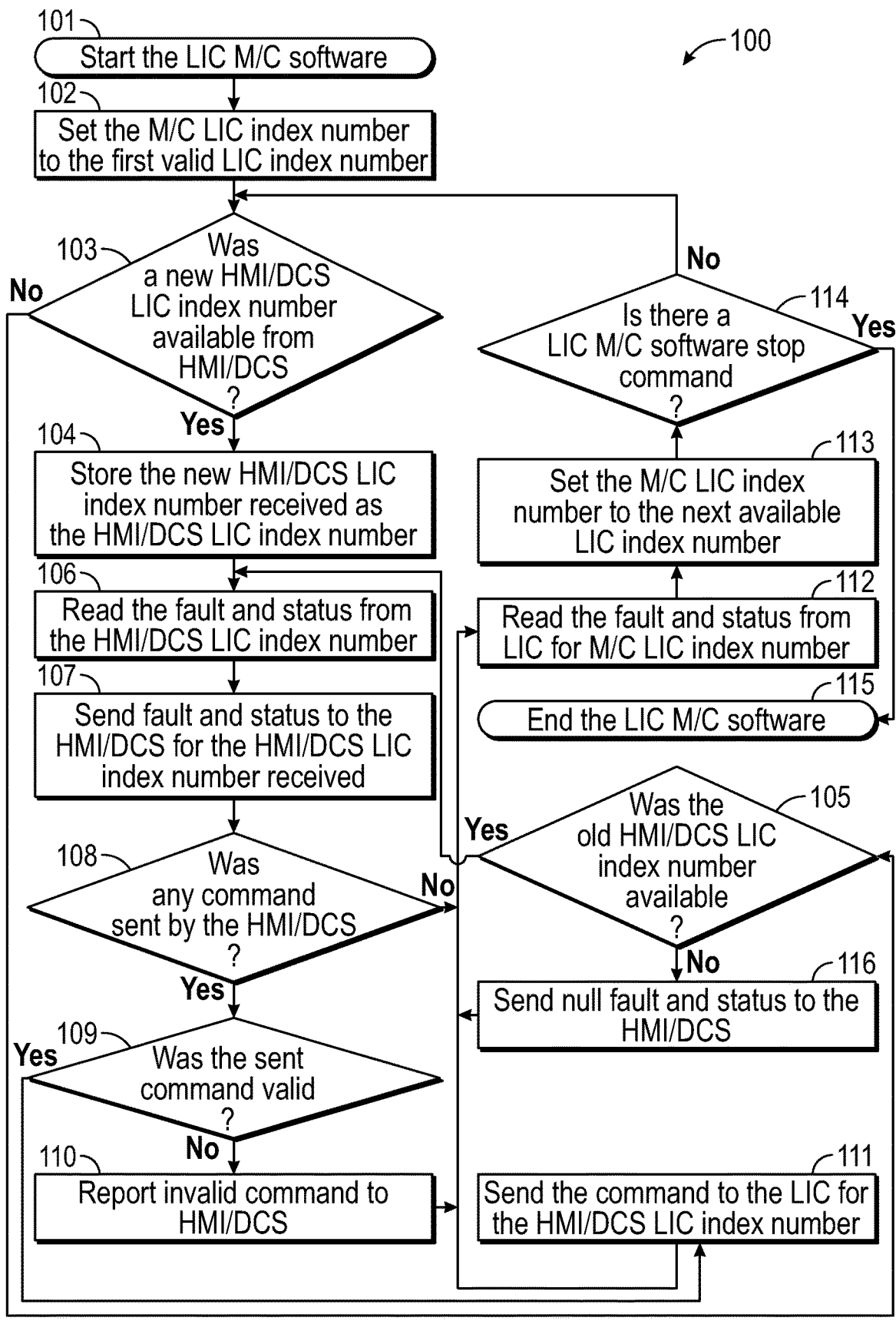
FIG. 1 includes a process for a local intervention controller monitoring/communication module (LIC M/C) in an embodiment.

FIG. 1 includes a logic flow diagram for a LIC monitoring/communication (LIC M/C) module in an embodiment. Such a module is included as element 510 in FIG. 5. It may be resident on a computing node located remotely from the LIC.

Figure 2:
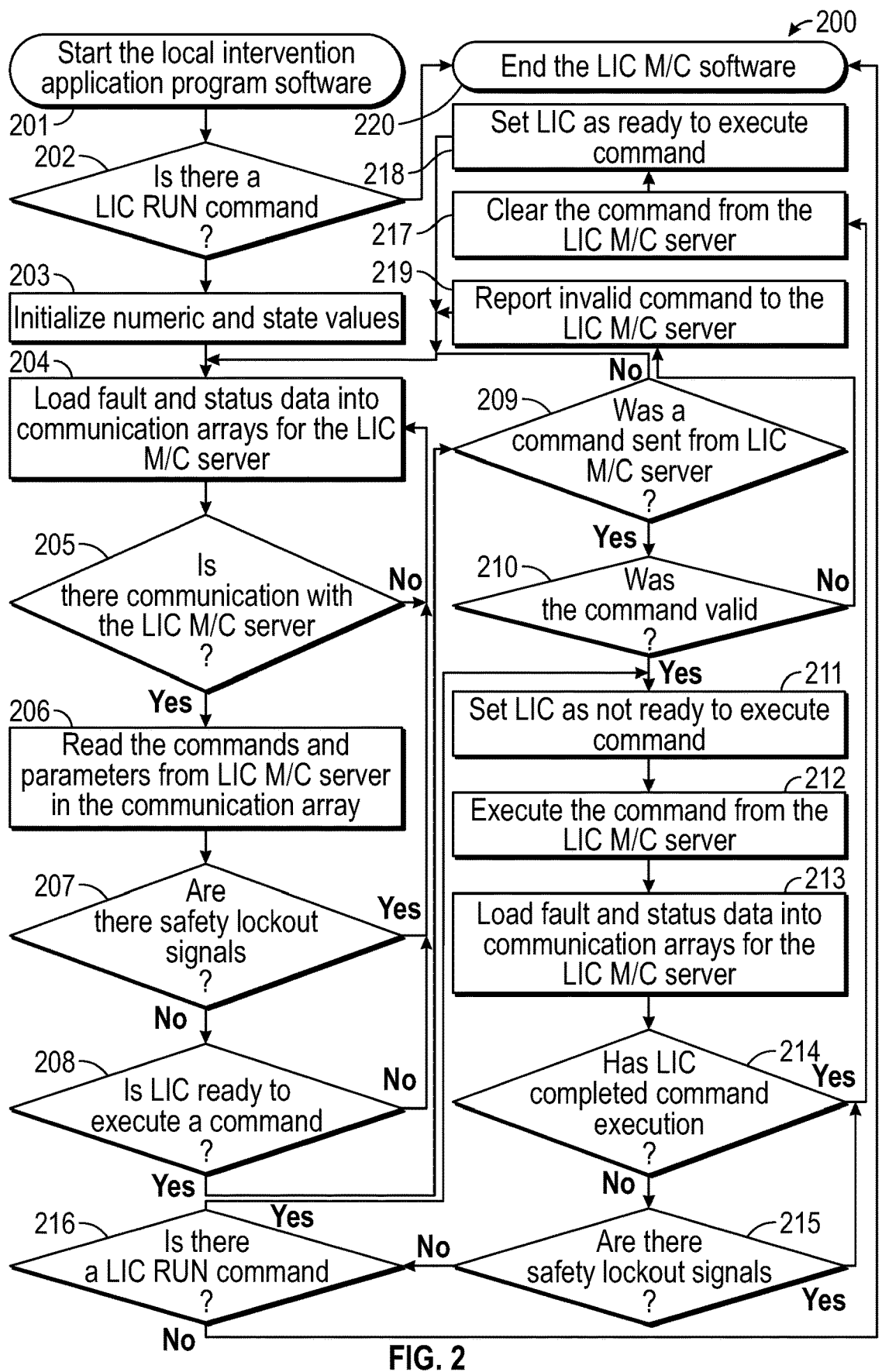
FIG. 2 includes a process for a local intervention controller (LIC) module in an embodiment.

FIG. 2 includes a logic flow diagram for a LIC in an embodiment. Such an LIC is included as element 512 in FIG. 5.

Figure 3:
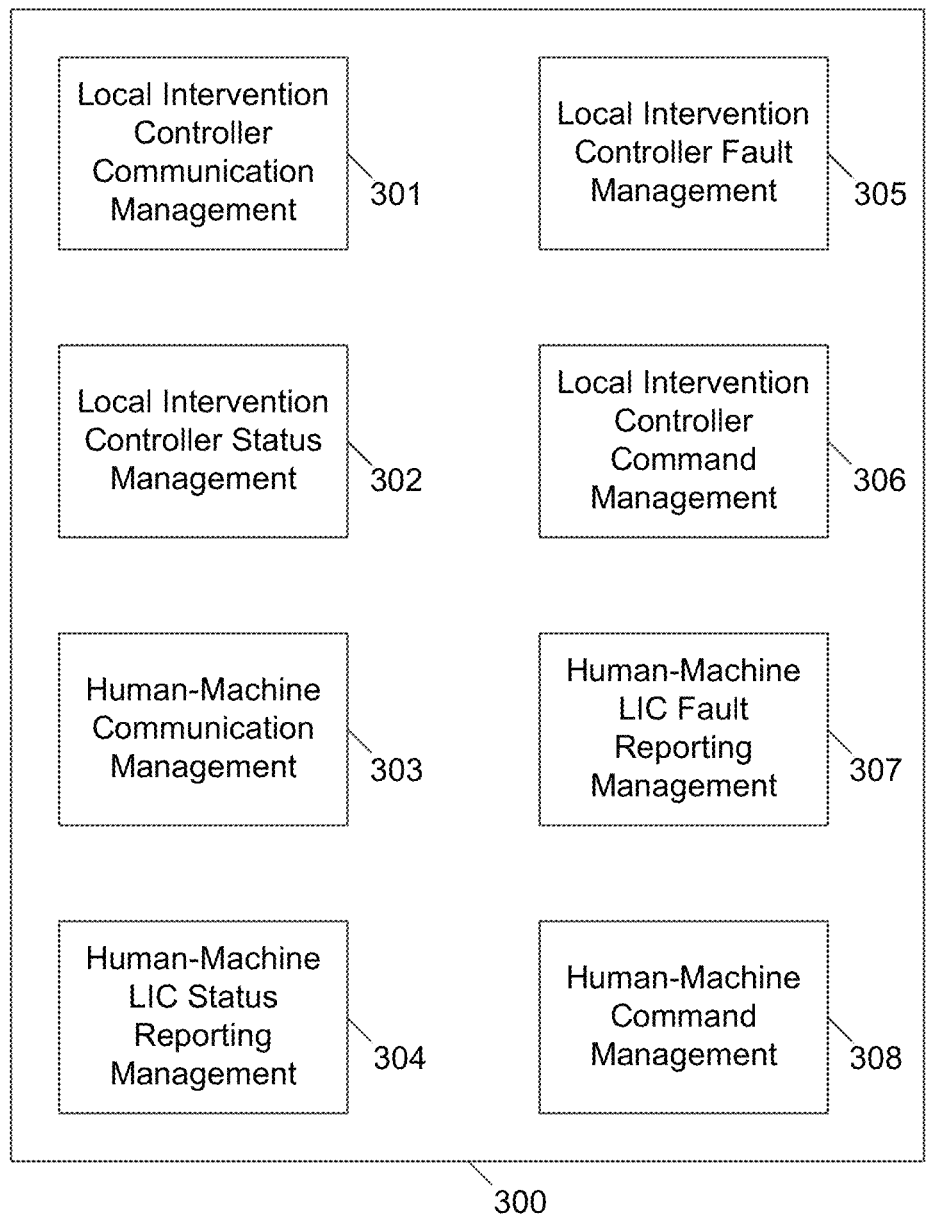
FIG. 3 includes a representation of components of a LIC M/C module in an embodiment.

FIG. 3 includes a block diagram with logic modules for the LIC M/C software module in an embodiment. System 300 may be included in a server system such as element 510 in FIG. 5.

Figure 4:
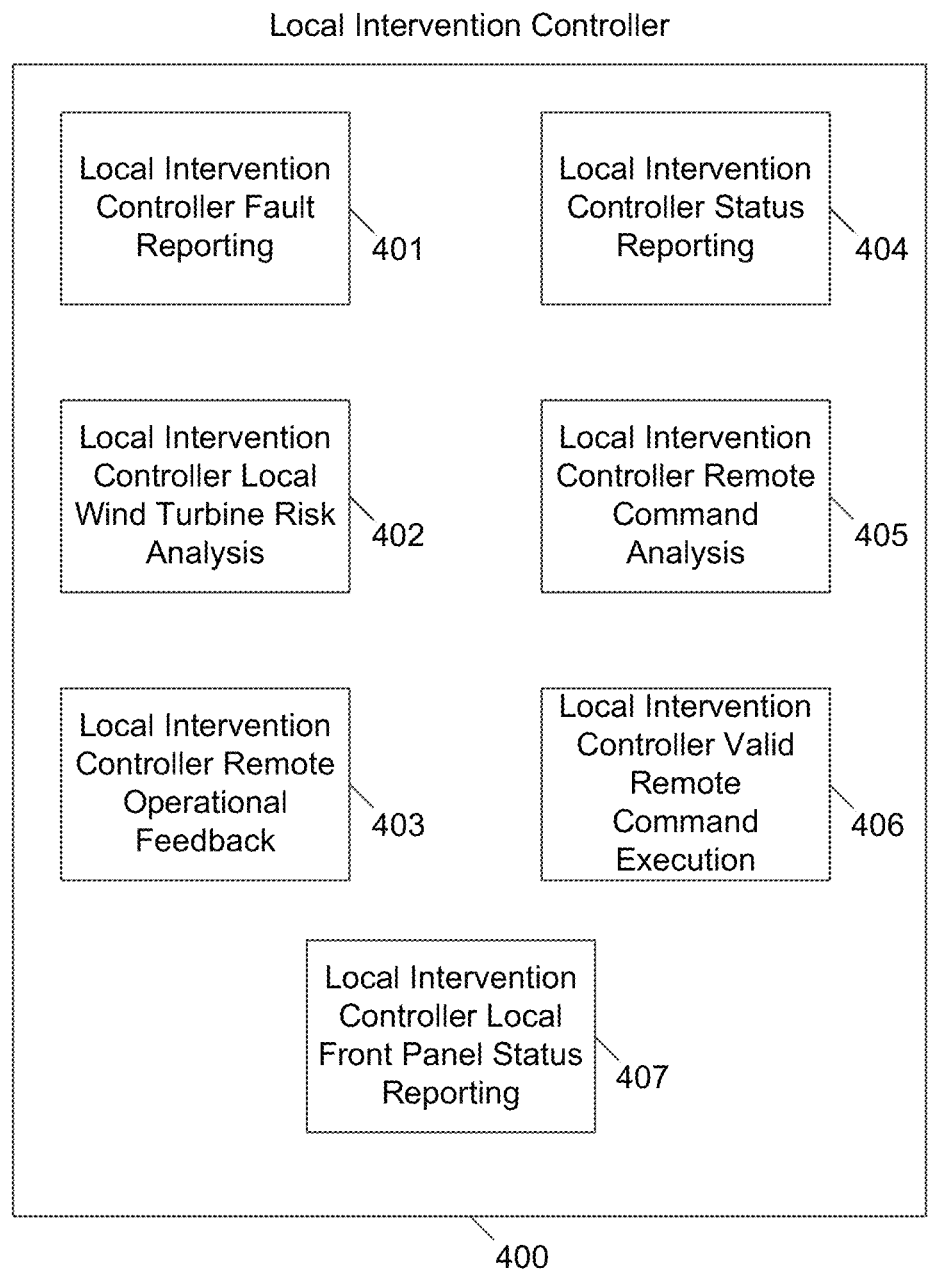
FIG. 4 includes a representation of components of a LIC module in an embodiment.
Figure 5:
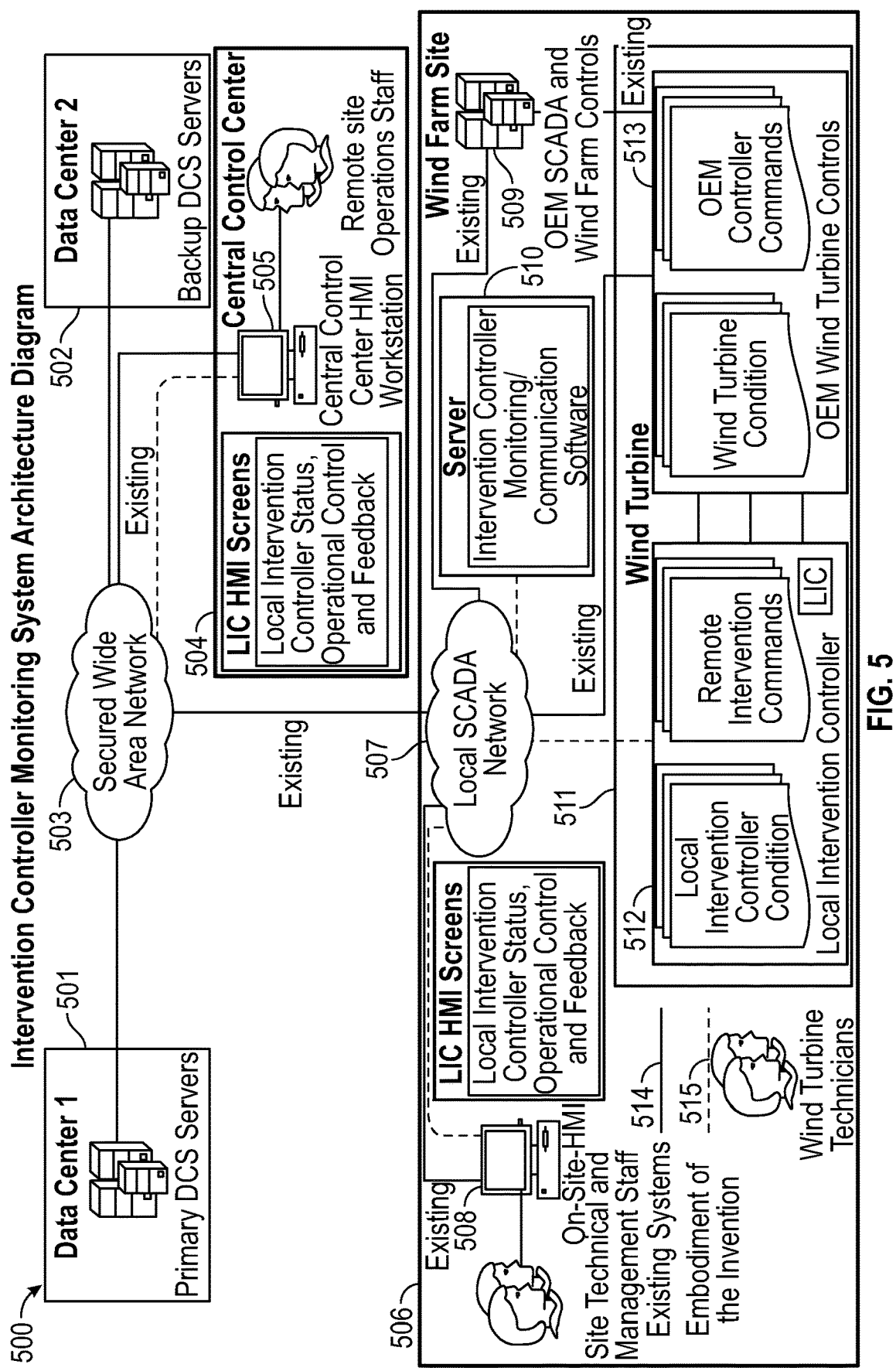
FIG. 5 includes a system comprising an LIC and an LIC M/C in an embodiment.

FIG. 4 includes a block diagram with logic modules for an embodiment of a LIC such as element 512 in FIG. 5.

FIG. 5 includes an LIC monitoring system architecture in an embodiment.

Figure 6:
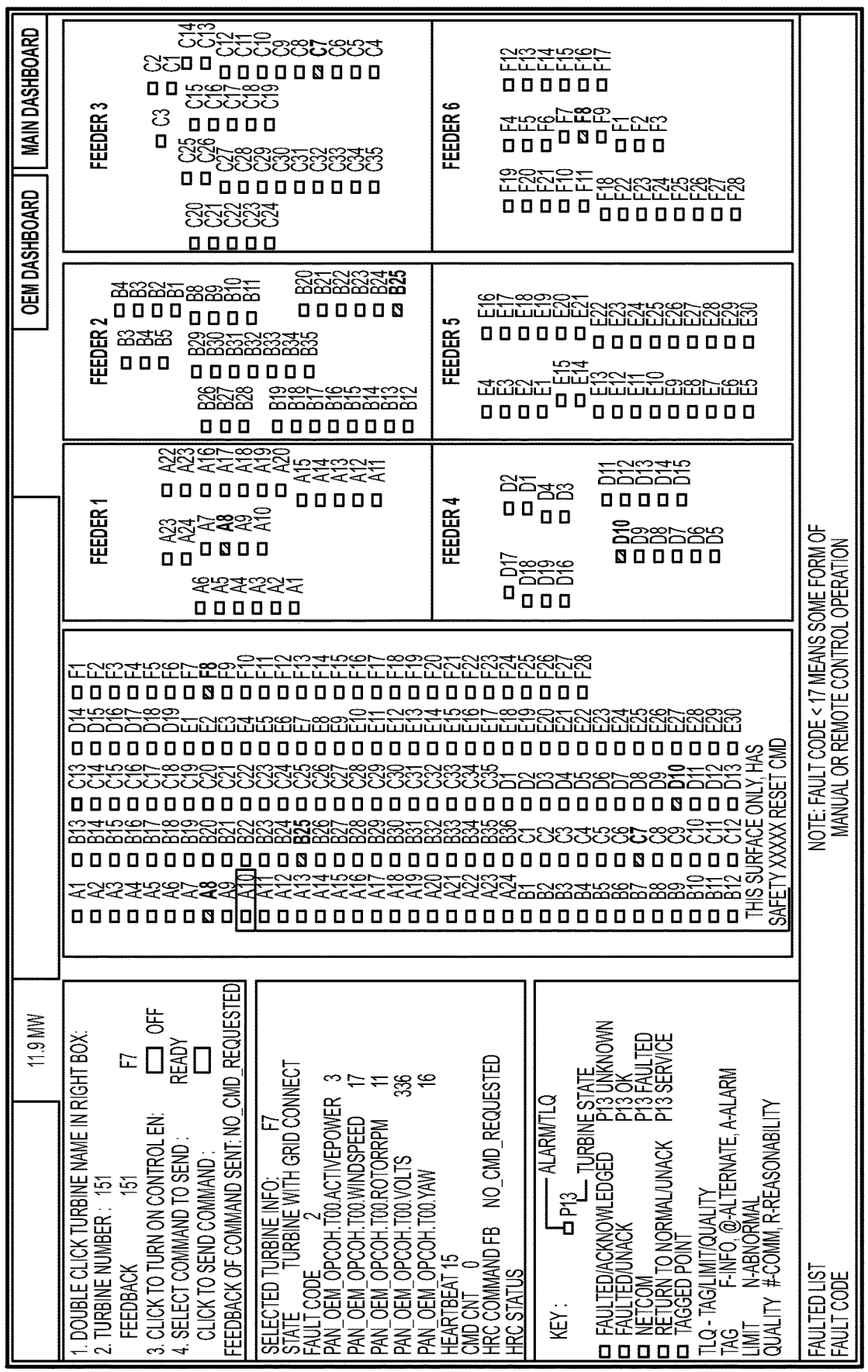

FIG. 6 includes an embodiment of a HMI (e.g., a GUI) to monitor statuses for many turbines and/or LICs.

FIG. 7 includes a highlighted portion of the GUI of FIG. 6. FIG. 7 provides detailed information about a wind turbine and LIC condition. Elements of the highlighted portion are specific to the LIC.

FIG. 8 includes a highlighted portion of the GUI of FIG. 6. FIG. 8 provides status and fault indicators for available wind turbines and LICs. Elements of the highlighted portion are specific to the turbines.

FIG. 9 includes an embodiment of a GUI listing status and/or commands for a LIC.

Figure 10:
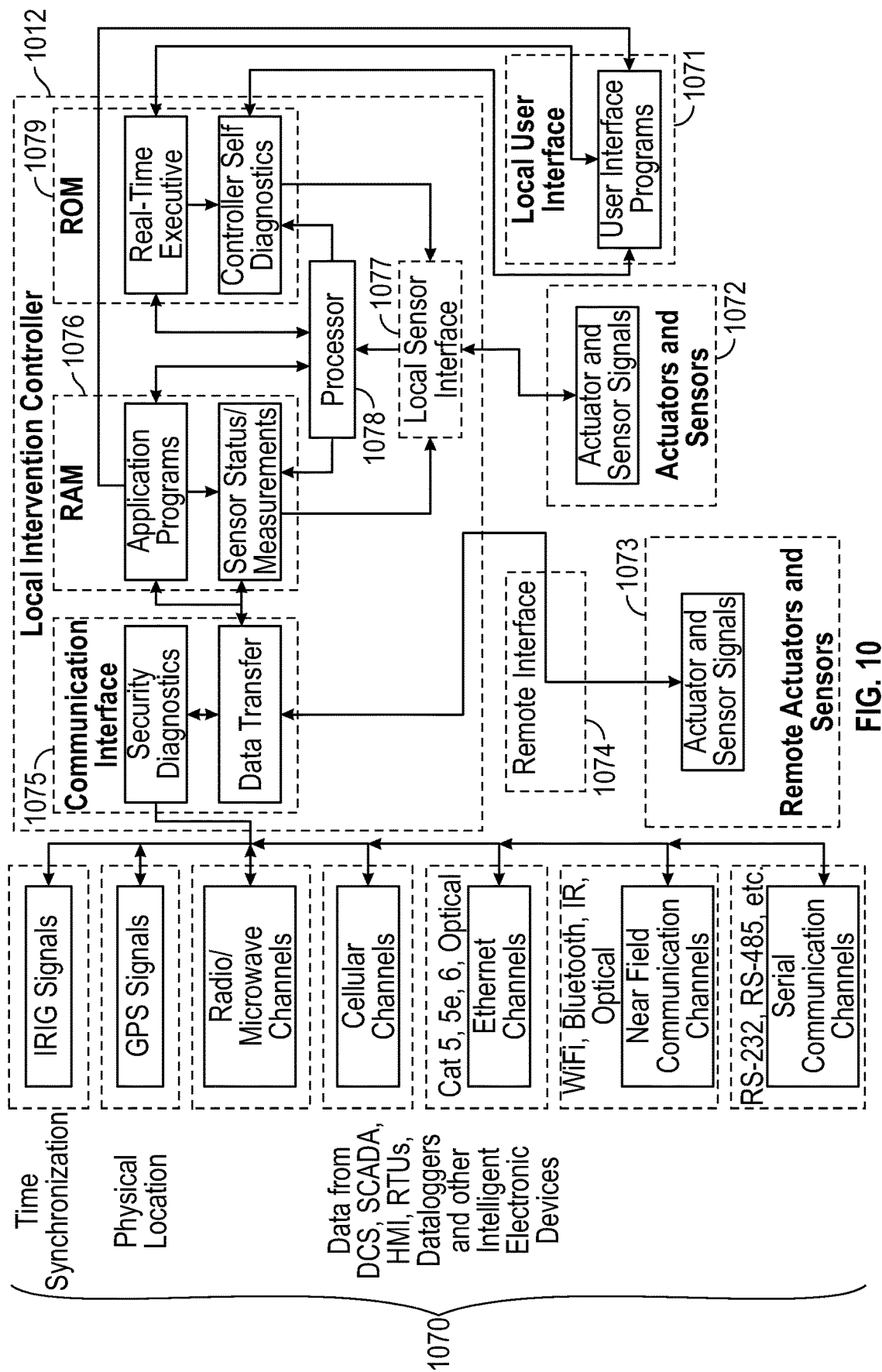
FIG. 10 depicts an LIC in an embodiment.

FIG. 10 depicts a system demonstrating how an embodiment of a LIC interfaces various components of a turbine system.

Figure 11:
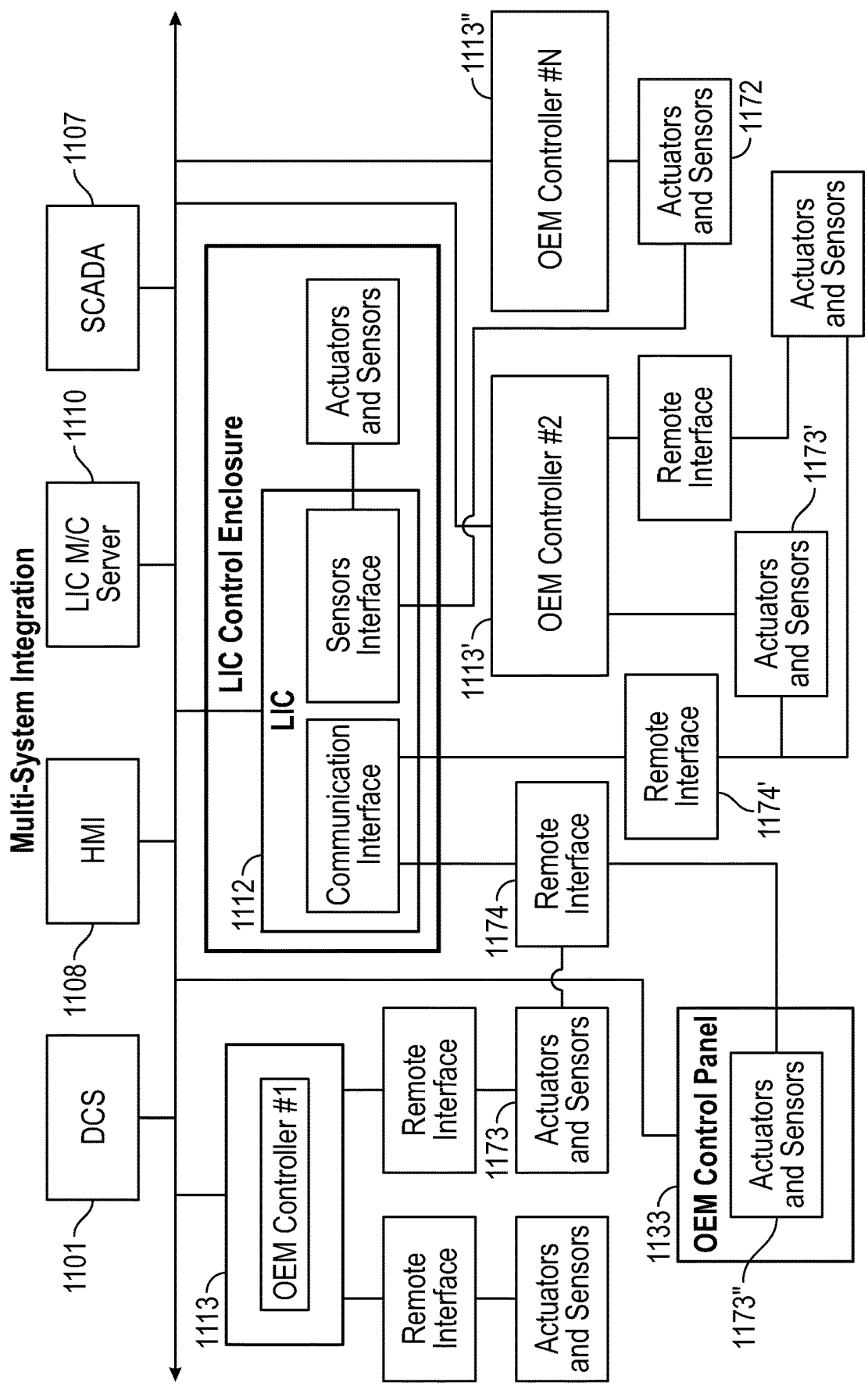
FIG. 11 illustrates how an LIC interfaces wind turbine controllers in an embodiment.

FIG. 11 depicts a system demonstrating how an embodiment of a LIC interfaces various components of a turbine system.

Figure 12:
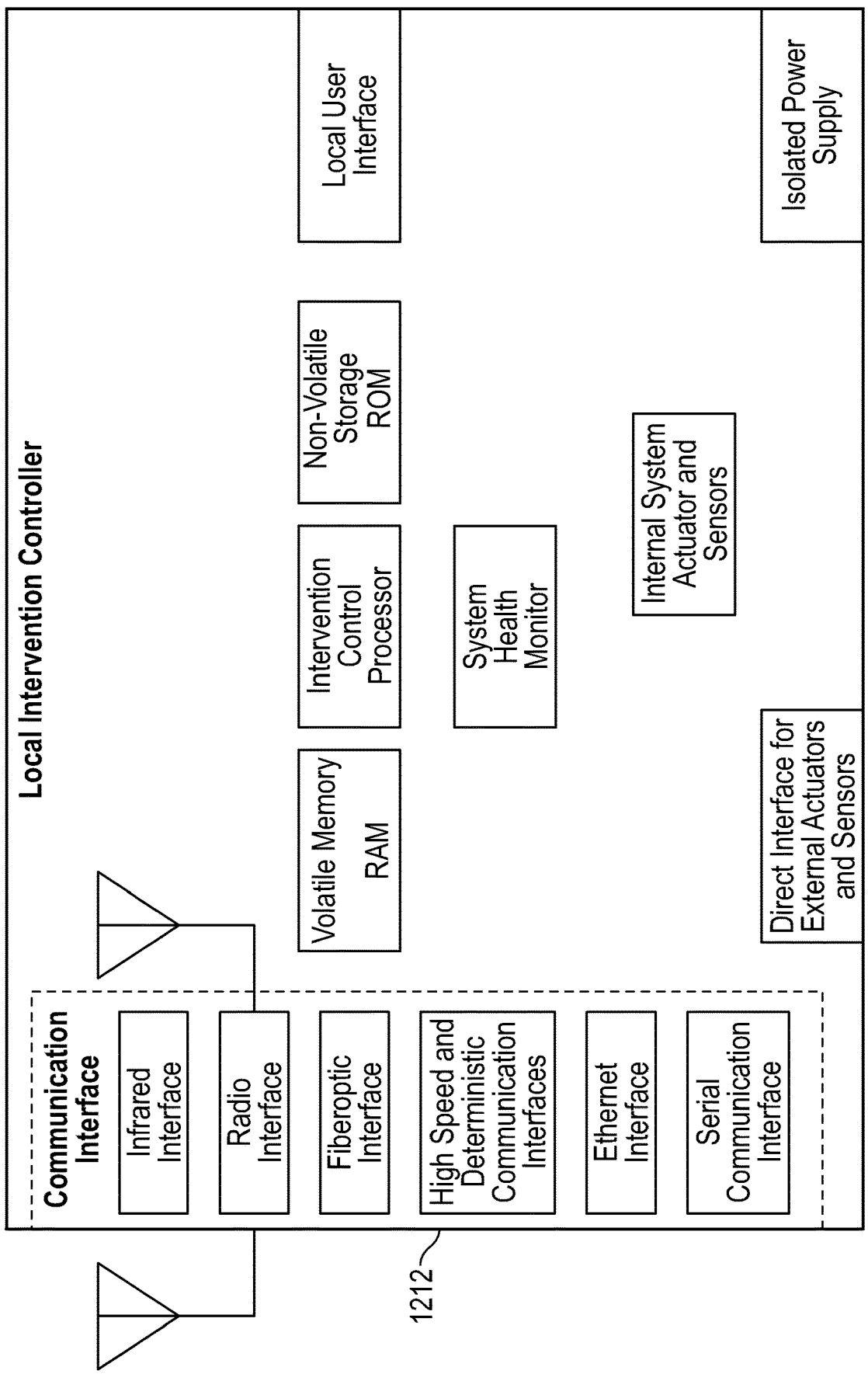
FIG. 12 depicts an LIC in an embodiment.

FIG. 12 depicts an embodiment of an LIC.

FIG. 13 depicts various isolation modules in various embodiments.

Embodiments provide many advantages.

Embodiments provide a first advantage as follows. An embodiment uses an existing communication infrastructure to carry fault, status and control information between the LIC 512 and associated LIC M/C server 510 and/or HMI systems 505, 508.

More specifically, FIG. 5 shows an implementation of an LIC in a supervisory control and data acquisition (SCADA) control system architecture. A SCADA architecture uses computers, networked data communications and GUIs for high-level process supervisory management, but uses other peripheral devices such as controllers 512 (e.g., programmable logic controllers, digital and/or proportional-integral-derivative controller (PID) controllers with logic capabilities) to interface to the machinery (e.g., turbine). The operator (e.g., a human employee or contractor for a wind farm) is provided with interfaces which enable monitoring of machinery and the issuing of process commands (e.g., controller set point changes)—all through the SCADA supervisory computer system. However, in embodiments some real-time control logic or controller calculations may be performed by networked modules which connect to the field sensors and actuators.

A SCADA architecture provides a means of remote access to a variety of local control modules, which could be from different manufacturers allowing access through standard automation protocols. A SCADA system may be very similar to a distributed control system (DCS) in function, but using multiple means of interfacing with the machinery. A wide area SCADA network can control large-scale processes that can include multiple sites, and work over large distances.

The specific architecture in which LIC embodiments are employed may vary and may include SCADA architectures, DCS, and the like but is not limited to any one particular architecture.

Again focusing on the above mentioned first advantage, embodiments comprising logic (e.g., elements 512 and/or 510) may utilize communication paths 514 and networks 503, 507 that already exist for a wind farm. Given sufficient unused communication bandwidth and capacity of such preexisting communication paths/networks, implementing LIC systems (e.g., elements 512 and/or 510) causes little to no change in operation of HMIs 505, 508, DCSs, and the like.

Regarding FIG. 5 more generally, system 500 includes a wind farm site 506 that includes many turbines, one of which is depicted at element 511 (e.g., GE SLE wind turbine). Turbine 511 communicates with wind farm control computing node 509 as well as HMI 508 via network 507. Network 507 couples to network 503, which in turn couples to DCS server 501 (which is backed up by DCS server 502) and HMI 505.

System 500 provides an ability to perform a supervisory operation over a variety of devices, such as LIC 512. System 500 may be organized using a general model which shows functional levels using computerized control. Level 0 of the model may contain field devices such as wind speed and temperature sensors. Level 1 of such a model may contain input/output (I/O) modules (to which an LIC couples) and their associated distributed electronic processors, such as LIC 512. Level 2 of such a model may contain the supervisory computers, which collate information from processor nodes on the system, and provide the operator control screens. Such computing nodes may include nodes 508, 509, 510. Level 3 of such a model is the production control level, which does not directly control the process, but is concerned with monitoring production and targets. Level 4 of such a model is the production scheduling level. Levels 3 and 4 may include elements of system 500 located outside of wind farm site 506 (e.g., HMI 505).

Level 1 contains controllers (e.g., LIC) such as programmable logic controllers (PLCs) and/or remote terminal units (RTUs). Level 2 contains the SCADA software and computing platform. The SCADA software exists at this supervisory level as control actions are performed (automatically in some cases but not in others) by RTUs and/or PLCs of Level 1. SCADA control functions may be restricted to basic overriding or supervisory level intervention. For example, a PLC may control the amount of electrical energy generated to a set point level, but the SCADA system software will allow operators to change the set point. The SCADA also enables alarm conditions, such as a high temperature, to be displayed and recorded (see FIG. 6). A feedback control loop is directly controlled by the RTU or PLC, but the SCADA software monitors the overall performance of the loop. Levels 3 and 4 are not strictly process control in the traditional sense, but are where production control and scheduling takes place.

Data acquisition begins with sensors and the RTU or PLC level and includes instrumentation readings and equipment status reports that are communicated to level 2 SCADA as required. Data are then compiled and formatted in such a way that a control room operator using the HMI can make supervisory decisions to adjust or override normal RTU (PLC) controls. Data may also be fed to a historian, often built on a commodity database management system, to allow trending and other analytical auditing.

Supervisory computers provide a core of a SCADA system, gathering data on the process and sending control commands to the field connected devices. It refers to the computer and software responsible for communicating with the field connection controllers, which are RTUs and PLCs, and includes the HMI software running on operator workstations. In smaller SCADA systems, the supervisory computer may be composed of a single PC, in which case the HMI is a part of this computer. In larger SCADA systems, the master station may include several HMIs hosted on client computers, multiple servers for data acquisition, distributed software applications, and disaster recovery sites. To increase the integrity of the system, multiple servers will often be configured in a dual-redundant or hot-standby formation providing continuous control and monitoring in the event of a server malfunction or breakdown.

RTUs connect to sensors and actuators in the process and are networked to the supervisory computer system. RTUs are "intelligent I/O" and often have embedded control capabilities such as ladder logic in order to accomplish Boolean logic operations. PLCs are connected to sensors and actuators in the process, and are networked to the supervisory system in the same way as RTUs. PLCs have more sophisticated embedded control capabilities than RTUs, and are programmed in one or more languages (e.g., IEC 61131-3 programming languages). PLCs are often used in place of RTUs as field devices because they are more economical, versatile, flexible and configurable. LICs may be any form of controller, including intelligent electronic devices, PLCs and RTUs.

The communication infrastructure connects the supervisory computer system to the RTUs and PLCs, and may use industry standard or manufacturer proprietary protocols. Both RTUs and PLCs may operate autonomously on the near-real time control of the process, using the last command given from the supervisory system. Failure of the communications network does not necessarily stop the wind farm process controls, and on resumption of communications, the operator can continue with monitoring and control. In some embodiments an LIC module will continue to attempt to restart a wind turbine until the turbine restarts. This is described more in detail with regard to FIG. 2 (see loop created by blocks 214, 215, 216). Some critical systems will have dual redundant data highways, often cabled via diverse routes.

The HMI is the operator window of the supervisory system. It may present wind farm information to the operating personnel graphically in the form of mimic diagrams, which are a schematic representation of the farm being controlled, and alarm and event logging pages. The HMI is linked to the SCADA supervisory computer to provide live data to drive the mimic diagrams, alarm displays and trending graphs. In many installations the HMI is the GUI for the operator, collects all data from external devices, creates reports, performs alarming, sends notifications, etc.

Mimic diagrams consist of line graphics and schematic symbols to represent process elements, or may consist of digital photographs of the process equipment overlain with animated symbols. Supervisory operation of the wind farm is by means of the HMI, with operators issuing commands using mouse pointers, keyboards and touch screens (see FIG. 7). For example, a symbol of a turbine can show the operator that the turbine is running, and a RPM meter symbol can show RPM for the turbine. The operator can switch the turbine off from the mimic by a mouse click or screen touch. The HMI will show the RPM decrease in real time. The HMI may be used to monitor MWh of turbines and the like.

An important part of most SCADA implementations is alarm handling. The system monitors whether certain alarm conditions are satisfied, to determine when an alarm event has occurred. Once an alarm event has been detected, one or more actions are taken (such as the activation of one or more alarm indicators, and perhaps the generation of email or text messages so that management or remote SCADA operators are informed). In many cases, a SCADA operator may have to acknowledge the alarm event; this may deactivate some alarm indicators, whereas other indicators remain active until the alarm conditions are cleared.

Alarm conditions can be explicit—for example, an alarm point is a digital status point that has either the value NORMAL or ALARM that is calculated by a formula based on the values in other analogue and digital points—or implicit: the SCADA system might automatically monitor whether the value in an analogue point lies outside high and low-limit values associated with that point.

Examples of alarm indicators include a siren, a pop-up box on a screen, or a colored or flashing area on a screen (that might act in a similar way to the "fuel tank empty" light in a car); in each case, the role of the alarm indicator is to draw the operator's attention to the part of the system 'in alarm' so that appropriate action can be taken.

FIG. 8 provides examples of alarms/fault indicators for various turbines. Based on such an alarm, an operator may utilize a GUI (such as the GUI of FIG. 7) to instruct (using a command such as a command of FIGS. 6 and/or 9) LIC 512 to restart a turbine that is stopped or in some fault state.

Embodiments provide a second advantage as follows. The HMI screens (that focus on LIC status, fault, and/or other LIC related information) can be implemented on a separate set of computers (from the HMIs focusing on other wind farm related monitoring) to avoid making any changes to existing HMIs and DCSs. Thus, for units 505, 508 a GUI focused on LIC 512 (such as GUIs shown generally in FIG. 6 and more specifically at FIG. 7) may be included with other GUIs (e.g., FIG. 6) or may be implemented as a separate GUI on the same computing node as other GUIs or on a separate computing node altogether.

Embodiments provide a third advantage as follows. The LIC HMI screens display LIC fault and status information for all LICs in system 500. Remote users can determine the availability of remote intervention function from system overviews (e.g., FIG. 8), then review the condition of an individual LIC in greater detail (e.g., FIG. 6).

Embodiments provide a fourth advantage as follows. The local intervention components (e.g., elements 510 and/or 512) are isolated to prevent interference with the signal input/output (I/O) circuits of the existing OEM control system 513. For instance, hardware and/or software for turbine controls 513 is not modified by LIC 512 or by its installation. An embodiment of the Remote Intervention System (e.g., elements 510 and/or 512) uses electro-mechanical relay contacts to maintain isolation from the wind turbine controls power supply. In other words, a LIC 512 will utilize such relay contacts when communicating with element 513.

As used herein, a relay is an electrically operated switch. Many relays use an electromagnet to mechanically operate a switch. For example, magnetic latching relays require one pulse of coil power to move their contacts in one direction, and another, redirected pulse to move them back. Repeated pulses from the same input have no effect. Magnetic latching relays are useful in embodiments where interrupted power should not be able to transition the contacts.

As a result, loss of electrical power to the LIC leaves the wind turbine in its normal operating state without disruption. For example, once the intervention signals are sent, loss of communication with LIC 512 (i.e., between elements 510 and 512) does not put the success of the intervention or normal function of the machine 511 at risk. This is in contrast to systems that may alter hardware and/or software of controls 513. If such an apparatus issues a command and the communication is lost to the apparatus then that command may be implemented for longer than ideal without the ability for an operator to remotely reverse or alter the command until communications (between the operator and the apparatus) are renewed.

Further, since the local intervention system (e.g., elements 510 and/or 512) does not use signal I/O channels of OEM or incumbent control systems there is no interference with future updates that requires use of I/O channels left unused by the OEM. For example, a LIC may communicate through an unused I/O of element 513. But then a software upgrade to control system 513 may transition the previously unused I/O (that was actually being used by the LIC) to a used I/O. This would then utilize that same I/O as the I/O the LIC was using and therefore a conflict would arise. This conflict is avoided in embodiments described herein. Similarly, the local intervention system requires no modifications to control programs supplied with the OEM controllers. For example, implementation of LIC 512 does not involve changing OEM code for controller 513. When the OEM updates software for controller 513 this may erase any patch or code augmentation that was to be used to enable communication with LIC 512. This issue is avoided in embodiments described herein. Thus, on-going modifications and management of specialty software version are avoided. The OEM Control systems will continue to accept the OEM software updates without need for modifying those updates.

In an embodiment the LIC 512 is installed at each turbine and the LIC M/C software component 510 is installed in a secure local area network. A HMI (e.g., FIG. 7), with access to the LIC M/C software component 510 provides intervention access that mimics local control functions.

Embodiments provide a fifth advantage as follows. The technicians at the wind turbine can use the manual controls to block operation of the LICs when turbine maintenance or repair is required. Thus, a remote operator that attempts to restart a turbine via a command from a LIC would not succeed in restarting the turbine (which may be in the process of being serviced by a local on-site technician) due to the block operation. Thus, the OEM manual control panel allows for the protection of persons performing wind turbine maintenance.

Embodiments provide a sixth advantage as follows. The combination of the LIC logic 512 and LIC M/C logic 510 provides redundancy that prevents execution of erroneous commands. Further, loss of communication between the LIC 512 and LIC M/C logic 510 during command execution does not interrupt completion of remote intervention commands.

Regarding FIG. 2 in particular, method 200 discloses logic for operation of the LIC, such as LIC 512. Blocks 201, 202, 203, 204 address initialization elements for the LIC. Blocks 205, 206 address receiving commands from the LIC M/C server (element 510). Of course the division between elements 510 and 512 does not have to be structured in any one way. Elements 510, 512 are logic modules that in many cases will be on separate discrete computing nodes but in other embodiments their modules may be included in a single discrete computing node. Block 207 addresses the ability for local technicians to lockout the LIC such that its commands are not received by controller 513 (or at least not acted upon). As addressed above, this may occur during times where technicians are servicing turbine 511. Block 208 determines whether the LIC is ready to execute commands and blocks 209, 210, 219, 211 address a LIC preparing to execute a command received from element 510. Such a command may entail the LIC restarting a turbine that has stopped for whatever reason. Block 212 addresses actual execution of the command. The command may be sent to relays of the controller 513. Blocks 213, 214, 215, 216 address logic steps once execution of the command commences. Blocks 217, 218 address logic steps after execution is completed. Block 220 addresses the situation when element 510 has not delivered a run command to the LIC.

FIG. 1 is analogous to FIG. 2. Whereas FIG. 2 method 200 focuses on the LIC 512 and LIC M/C server 510 interaction from the LIC's viewpoint, FIG. 1 and method 100 instead focus on the LIC 512 and LIC M/C server 510 interaction from the LIC M/C server's viewpoint. Blocks 101, 102, 103, 104, 105 address initialization for communication with one or more LICs. Once an index number is determined (which corresponds to a specific LIC), a specific LIC is now the focus. Blocks 106, 107 address determining fault and status information (or other information in other embodiments) and communicating the same to HMI 508 and/or 505. Blocks 108, 109, 110, 111 address determining if HMI 508 and/or 505 have a command that needs to be communicated to LIC 512 and then eventually communicating such a command to the LIC. Block 112 addresses reading fault and status from the LIC and block 113 addresses moving on to monitoring/communicating with another LIC. With a large wind farm there may be many LICs assigned to any one LIC M/C server 510. Block 114 addresses continuing a loop of monitoring LICs or ending such monitoring in block 115.

While systems and methods for remotely managing wind power generation have been discussed herein, such systems and methods are not necessarily restricted to wind power generation and may be used for other applications. For example, other applications include energy farms based on solar or hydroelectric installations. Solar arrays may enter into a fault mode for any number of reasons and as a result, units of such arrays may not be able to rotate (to better track the sun) or otherwise be controlled in a desired fashion. An analogous situation may concern water propelled turbines, propellers, or similar hydroelectric energy generators. The same is true for geothermal units as well as other renewable energy units (e.g., biomass). Remote intervention of power generation units (including wind, solar, hydro or otherwise) may be accomplished using embodiments described herein.

Embodiments may use alternative methods such as, without limitation, (1) use of cellular modems for communication with LICs and or LIC M/Cs, (2) the use of a mechanical actuator (pneumatic, hydraulic) in place of electro-mechanical contacts to achieve isolation from machine control circuits such as controller 513, and (3) the use of auxiliary contact decks, or non-contact sensors (such as magnetic, proximity, photo electronic, etc.) to monitor the condition of panel devices while maintaining isolation from machine control circuits.

Referring now to FIG. 10, LIC 1012 may communicate with varying environments via any number of channels 1070, which include radio, Ethernet, near field communication (NFC), and the like. Thus, a remote user may interface the LIC remotely using one or more of channels 1070 (without having to be physically present with the LIC) to control the LIC. However, interface 1071 provides another path for a user that is physically present with the LIC (e.g., an on-site wind turbine technician) to interface with the LIC 1012. LIC 1012 may include one or more memories, such as RAM 1076 and/or ROM 1079. ROM 1079 may include logic for controller self-diagnostics and for interfacing processor 1078, which in turn couples to RAM 1076. RAM 1076 may include application programs for communicating with various sensors and controllers 1072, 1073. This communication may be direct or indirect. Thus, in an embodiment channels 1070 may couple LIC 1012 to nodes that communicate data from DCS (e.g., element 501 of FIG. 5), SCADA (e.g., element 507 of FIG. 5), HMI (e.g., element 508 of FIG. 5), and the like. An LIC can use such channels (e.g., channels 1070) to coordinate data transfers (see "data transfer" of element 1075), signal timing, and/or introduce timestamps between incompatible devices.

For instance, application programs stored in RAM 1076 may communicate with sensor status measurements stored within RAM 1076 (which may be included within one or more memory modules). For example, the sensor status or measurement may include a sensor status indicating a temperature (corresponding to a temperature in or out of a turbine) of X. This status may then be communicated (via local sensor interface 1077) to actuator and sensor signals module 1072, which may be analogous to "wind turbine condition" of OEM Wind Turbine controls controller 513 of FIG. 5.

As another example, application programs stored in RAM 1076 may communicate with sensor status measurements stored within RAM 1076 (which may be included within one or more memory modules). For example, the "sensor status or measurement" of RAM 1076 may more broadly include a simple status or command that is not necessarily tied to a sensor. For example, the status may indicate the turbine is not operating and may include a command to restart the turbine. This command and/or status may be communicated to an actuator 1072 via local sensor interface 1077 or may communicated via data transfer paths (see communication interface 1075), remote interface 1074 (which maybe be coupled or included within controller 513 (See FIG. 5), and eventually communicated to an actuator 1073 controlled via controller 513.

Operation of application programs within RAM 1076 may occur via commands received via any channel 1070 and communication interface 1075 (which may perform security diagnostics (e.g., certificate inspection) on any command.

FIG. 11 depicts LIC 1112, which is analogous to LIC 1012 (FIG. 10). LIC 1112 includes modules analogous to modules 1075 and 1077. LIC 1112 couples to actuators/sensors 1172 (which are analogous to actuators/sensors 1072) as well as remote interfaces 1174, 1174' (which are analogous to remote interface 1074). These remote interfaces 1174, 1174' couple to remote actuators and sensors 1173, 1173', 1173" (which are analogous to module 1073). Thus, FIG. 11 shows how a single LIC may provide remote control to not only a single OEM controller (analogous to controller 513 of FIG. 5) but to multiple controllers 1113, 1113', 1113". The may be done more directly (see controller 1113") or to various degrees of directness (modules 1174 to 1173 or 1174' to 1173'). In fact, interfacing OEM control pane 1 1133 allows access to the manual control functions or hard-wired circuits (which are unavailable using conventional controls).

Thus, an LIC can perform intervention functions both for individual OEM controllers (e.g., FIG. 10) or multiple control systems (e.g., controllers 1113, 1113', 1113" of FIG. 11) and/or standalone devices (e.g., control panel 1133 of FIG. 11).

FIG. 12 addresses LIC 1212, which has many components analogous to LIC 1012. However, LIC 1212 indicates an isolated power supply is isolated from any controller (e.g., controller 513) by any means, including the various isolation techniques depicted in FIG. 13. As a result, an embodiment provides methods of signal transfer while maintaining electrical isolation between components 512, 513. This isolation prevents controller malfunctions resulting from misapplied electrical power or electrical signals from other machines.

Program instructions (see, e.g., FIGS. 1 and 2) may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, memory chips, integrated circuits or other hardware, such as programmable logic devices. However, in another embodiment, logic also includes software or code integrated with hardware, such as firmware or micro-code.

Thus, embodiments provide various advantages.

An embodiment ensures a turbine does not receive a restart signal from the LIC that restarts the turbine despite a local user having placed the turbine in "lockout" mode (attempting to ensure the turbine does not operate due to, for example, ongoing maintenance of the same).

An embodiment allows a LIC to restart a turbine without altering code for the turbine controller.

Regarding the first advantage, an embodiment is configured to be subordinate to all human safety systems. In one embodiment, three methods of local shutdown or lockout are never overridden: (1) the detent in the emergency stop (or E-Stop) push button, (2) the Maintenance Mode Lockout Key Switch, and (3) the Repair Mode Lockout Key Switch.

For instance, when the contact of the E-Stop is open (see elements 511, 513 of FIG. 3) the interruption of electrical control power prevents operation of the wind turbine. The LIC is configured to monitor the operating mode key switch for either Maintenance or Repair mode. No remote commands are executed if either of these modes is selected. Thus, if the LIC senses any form of lockout the LIC will not convey remote commands to the controller 513. The LIC monitors for a lockout condition by monitoring, for example, the path between the E-stop button (and/or Maintenance Mode Lockout Key Switch circuitry and/or the Repair Mode Lockout Key Switch circuitry) and circuits of the controller 513.

Regarding the second advantage, in an embodiment if the wind turbine is in its normal operating mode, the LIC is configured to manipulate circuits (e.g., three circuits) using electrical relay contacts that perform the same electrical function as two manual control panel devices (where those two manual control devices would be actuated by person standing locally in the wind turbine). In an embodiment (e.g., for a GE SLE wind turbine) of a Safety Chain Reset/Restart application, these two manual control panel devices are: (1) the STOP/RESET pushbutton (one hard-wired control circuit, one controller input), and (2) the START pushbutton (one hard-wired control circuit).

In an embodiment the LIC is configured to only use control power from within the wind turbine to manipulate the circuits connected to the two pushbuttons identified above. In two of the circuits, parallel normally open contacts are used to transmit the required command In the third circuit, a normally closed relay contact is used to open the circuit thus transmitting the command. The LIC is configured to generate the necessary sequences and pulse durations to reset the safety chain and/or restart the wind turbine. Once a valid command is received from the LIC C/M server (and/or HDI 505, 508), the LIC is configured to act autonomously until the command is executed and return feedback. In addition to maintaining electrical isolation of the pushbutton control circuits, the LIC is configured to leave the circuits fully functional if it experiences loss of power. Further, logic in the LIC is designed to prevent the accidental generation of signals to the control circuits when its power is restored.

Thus, an embodiment uses one or more relays to create signal paths that interface the controller 513 in a way similar to how already existing hardware (e.g., STOP/RESET pushbutton) interface the controller 513. Signals similar to pre-existing signals (e.g., sequence and pulse duration) are then conveyed along those paths. The end result is that an act that requires a user to be present (e.g., a user manually pressing a STOP/RESET pushbutton while physically located at the turbine) is now mimicked so that the same result (e.g., restarting turbine) is achieved without having an operator to be physically present in the wind turbine to manipulate the STOP/RESET pushbutton.

Further, this is achieved using relays that provide electrical isolation and which will not alter the controller 513 if power or communication is lost with the LIC relay outputs. Further, the relays are hardware that will not be affected by software updates to the controller 513 or reassignment of unused I/O ports for the controller 513.

Regarding the embodiment of FIG. 11, the LIC interfaces many sensors and actuators (e.g., 1173 or 1173'). As one benefit, the LIC will not interfere with new I/O assignments for the controller. For example, above an embodiment describes interfacing a START/STOP button. From the LIC perspective, the START/STOP pushbutton is a sensor which provides an input to the controller. Similarly, from the LIC perspective a solenoid is an example of an actuator. Thus, the LIC may interface with sensors and/or actuators that in turn cooperate with controller 513. Relays may function as sensors and/or actuators and provide isolation between the controller 513 and the LIC 512. Thus, actuators/sensors 1173 may include a START and/or STOP/RESET button and/or relays coupled to the button.

Further, manual interventions to controller 513 may include use of a forcing function. A forcing function allows a user to override a condition and state as determined by logic or programming. Applicant determined such an intervention may cause turbine malfunction if the force is misapplied. For instance, the force may create an erroneous logic state or the force may be unintentionally left enabled and then forgotten. To address this, embodiments of the LIC do not use: (a) internal forcing functions in normal operation, or (b) the use of forcing function within the controller 513 program manipulations to carry out remote commands. The autonomous logic of embodiments of the LIC perform only the circuit interventions needed to execute remote commands and then disengages immediately and automatically upon completion of such commands.

Figure 14:
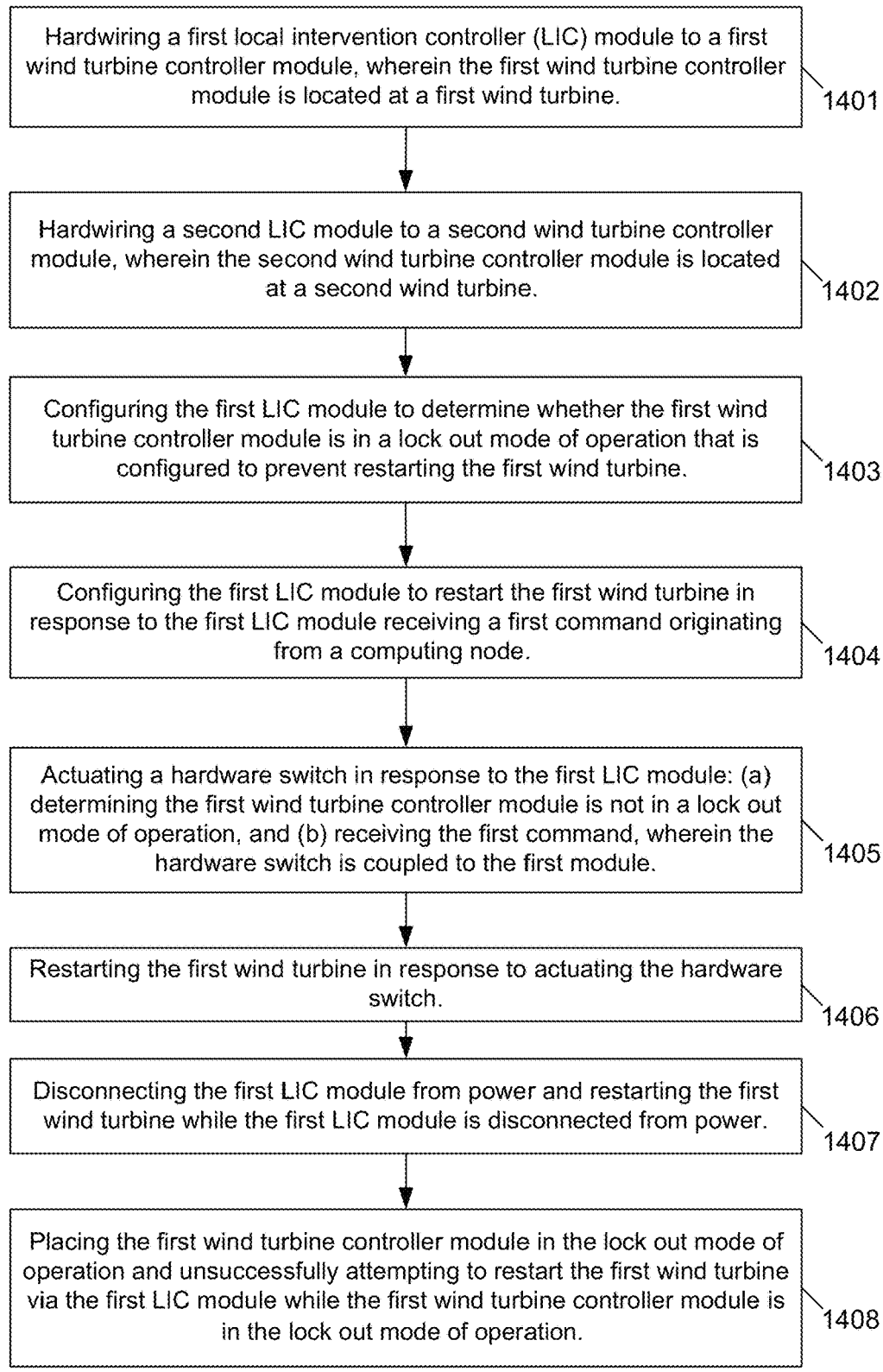
FIG. 14 includes a process in an embodiment.

FIG. 14 includes a process 1400 in an embodiment. Such a process covers, for example, the installation and field testing of a LIC module.

Block 1401 includes hardwiring a first local intervention controller (LIC) module to a first wind turbine controller module, wherein the first wind turbine controller module is located at a first wind turbine. Block 1402 includes hardwiring a second LIC module to a second wind turbine controller module, wherein the second wind turbine controller module is located at a second wind turbine. Blocks 1401 and 1402 may include a field technician manually hardwiring LIC modules to OEM wind turbine controller modules.

Block 1403 includes configuring the first LIC module to determine whether the first wind turbine controller module is in a lock out mode of operation that is configured to prevent restarting the first wind turbine. This may include the LIC module personnel installing code within memory of the LIC module where the code monitors for a lock out mode. This may include supplying power to logic that monitors for a lock out mode. This may include the technician coupling the LIC module to the wind turbine controller so the LIC module can detect if lock out mode has been initiated (e.g., monitoring a path that includes the Maintenance Mode Lockout Key and/or Repair Mode Lockout Key).

Block 1404 includes configuring the first LIC module to restart the first wind turbine in response to the first LIC module receiving a first command originating from a computing node. This may include the LIC module personnel installing code within memory of the LIC module where the code issues the third command of example 3a (see below) in response to receiving the first command of example 1a (see below). This may include supplying power to logic that issues the third command of example 3a (see below) in response to receiving the first command of example 1a (see below). This may include the technician coupling the LIC module to the wind turbine controller so the LIC module can deliver the third command to the wind turbine controller.

Block 1405 includes actuating a hardware switch in response to: (a) determining the first wind turbine controller module is not in a lock out mode of operation, and (b) the first LIC module receiving the first command, wherein the hardware switch is coupled to the first LIC module. For instance, this may include a field technician actuating the switch of example 2a (see below) to ensure the switch operates properly and can restart the wind controller. The technician may actuate the switch remotely from HDI 504, a cellular phone, LIC M/C module 510, and the like.

Block 1406 includes restarting the first wind turbine in response to actuating the hardware switch.

Block 1407 includes disconnecting the first LIC module from power and restarting the first wind turbine while the first LIC module is disconnected from power. This may include the field technician ensuring the STOP/RESET and/or START buttons of the wind turbine controller (e.g., the switch of example 1a below) continue to operate regardless of a power failure to the LIC module.

Block 1408 includes placing the first wind turbine controller module in the lock out mode of operation and unsuccessfully attempting to restart the first wind turbine via the first LIC module while the first wind turbine controller module is in the lock out mode of operation. This may include the field technician actuating the Maintenance Mode Lockout Key and then ensuring an attempt to restart the turbine via the LIC module fails.

Various examples of embodiments are now addressed.

Example 1

A system comprising: a first wind turbine controller module coupled to a first wind turbine; a second wind turbine controller module coupled to a second wind turbine; a first local intervention controller (LIC) module coupled to the first wind turbine controller module; a second LIC module coupled the second wind turbine controller module; a supervisory control and data acquisition (SCADA) control system coupled to: (a)(i) the first and second wind turbine controller modules, and (a)(ii) the first and second LIC modules; an LIC monitoring and communications (LIC M/C) module coupled to the first and second LIC modules and to the SCADA; wherein the first LIC module includes at least one non-transitory storage medium comprising instructions stored thereon for causing the first LIC module to: (b)(i) determine whether the first wind turbine controller module is in a lock out mode of operation configured to prevent restarting the first wind turbine; and (b)(ii) restart the first wind turbine in response to receiving a first command from a remote computing node located remotely from the first wind turbine; wherein: (c)(i) the first LIC module is coupled to a first power supply; (c)(ii) the first wind turbine controller module is coupled to an additional first supply power supply; and (c)(iii) the first power supply is electrically isolated from the additional first power supply.

Example 2

The system of example 1 wherein the first LIC module couples to the first wind turbine controller module via a hardware switch.

Example 3

The system of example 2 wherein: in an active state the hardware switch is closed and configured to communicate a second command to the first wind turbine controller module; in an inactive state the hardware switch is open and is prevented from communicating the second command to the first wind turbine controller module; the hardware switch enters the active state in response to power being supplied to the hardware switch; the hardware switch defaults to the inactive state in response to power being withdrawn from the hardware switch.

Example 4

The system of example 3 wherein the hardware switch includes an electro-mechanical relay switch.

Example 5

The system of example 3 wherein: the first wind turbine controller module comprises an additional hardware switch; in an active state the additional hardware switch is closed and configured to prevent restarting the first wind turbine independently of whether the hardware switch is in the active state.

Example 6

The system of example 2 wherein: the at least one non-transitory storage medium of the first LIC module comprises instructions to cause the first LIC module to restart the first wind turbine in response to the first LIC module communicating a second command to the hardware switch; the second command includes at least one of the first command and an additional first command.

Example 7

The system of example 6 wherein the first wind turbine controller module includes at least one non-transitory storage medium comprising instructions stored thereon for causing the first wind turbine controller module to restart the first wind turbine independently of the second command.

Example 8

The system of example 1 wherein the LIC M/C module includes at least one non-transitory storage medium comprising instructions stored thereon for causing the LIC M/C module to: determine the first wind turbine is not rotating; and determine the second wind turbine is rotating.

Example 9

The system of example 8 wherein: the at least one non-transitory storage medium of the LIC M/C module comprises instructions to cause the LIC M/C module to generate the first command in response to the LIC M/C module determining the first wind turbine is not rotating; the remote computing node includes the LIC M/C module.

Example 10

The system of example 1 comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module.

Example 11

The system of example 10 wherein the at least one non-transitory medium of the remote computing node comprises instructions to cause the remote computing node to communicate the first command from the remote computing node to the first LIC module in response to user input entered via the remote computing node.

Example 12

The system of example 1 comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module while avoiding communicating the first command from the remote computing node to the second LIC module.

Example 13

The system of example 1 wherein: the first LIC module includes at least one first processor and at least one first memory coupled to the at least one first processor; the second LIC module includes at least one second processor and at least one second memory coupled to the at least one second processor; the LIC M/C module includes at least one third processor and at least one third memory coupled to the at least one third processor; the first wind turbine controller module includes at least one fourth processor and at least one fourth memory coupled to the at least one fourth processor; the second wind turbine controller module includes at least one fifth processor and at least one fifth memory coupled to the at least one fifth processor.

Example 1a

A system comprising: a first wind turbine controller module located at a first wind turbine; a second wind turbine controller module located at a second wind turbine; a first local intervention controller (LIC) module located adjacent to the first wind turbine controller module; a second LIC module located adjacent to the second wind turbine controller module; a supervisory control and data acquisition (SCADA) control system coupled to: (a)(i) the first and second wind turbine controller modules, and (a)(ii) the first and second LIC modules; an LIC monitoring and communications (LIC M/C) module coupled to the first and second LIC modules and to the SCADA; wherein the first LIC module includes at least one non-transitory storage medium comprising instructions stored thereon for causing the first LIC module to: (b)(i) determine whether the first wind turbine controller module is in a lock out mode of operation that is configured to prevent restarting the first wind turbine; and (b)(ii) restart the first wind turbine in response to receiving a first command originating from at least one of the LIC M/C module or a remote computing node; wherein the LIC M/C module is not located at the first wind turbine and the remote computing node is not located at the first wind turbine; wherein the first wind turbine controller includes at least one non-transitory storage medium comprising instructions stored thereon for causing the first wind turbine controller to restart the first wind turbine in response to receiving a second command originating from a hardware switch located at the first wind turbine.

For instance, the LIC may be located within two to three meters of the OEM wind turbine controller. In an embodiment, the LIC may be hardwired to the wind turbine controller. However, in other embodiments the LIC may be located more than 0.5 kilometers from an OEM wind turbine controller with which is communicates wirelessly.

An alternative version of Example 1a. A system comprising: a first wind turbine controller module located at a first wind turbine; a second wind turbine controller module located at a second wind turbine; a first local intervention controller (LIC) module to couple to the first wind turbine controller module; a second LIC module to couple to the second wind turbine controller module; a supervisory control and data acquisition (SCADA) control system coupled to: (a)(i) the first and second wind turbine controller modules, and (a)(ii) the first and second LIC modules; an LIC monitoring and communications (LIC M/C) module coupled to the first and second LIC modules and to the SCADA; wherein the first LIC module includes at least one non-transitory storage medium comprising instructions stored thereon for causing the first LIC module to: (b)(i) determine whether the first wind turbine controller module is in a lock out mode of operation that is configured to prevent restarting the first wind turbine; and (b)(ii) restart the first wind turbine in response to receiving a first command originating from at least one of the LIC M/C module or a remote computing node; wherein the LIC M/C module is not located at the first wind turbine and the remote computing node is not located at the first wind turbine; wherein the first wind turbine controller includes at least one non-transitory storage medium comprising instructions stored thereon for causing the first wind turbine controller to restart the first wind turbine in response to receiving a second command originating from a hardware switch located at the first wind turbine.

An alternative version of Example 1a. A system comprising: a first wind turbine controller module located at a first wind turbine; a second wind turbine controller module located at a second wind turbine; a first local intervention controller (LIC) module to couple to the first wind turbine controller module; a second LIC module to couple to the second wind turbine controller module; a supervisory control and data acquisition (SCADA) control system coupled to: (a)(i) the first and second wind turbine controller modules, and (a)(ii) the first and second LIC modules; an LIC monitoring and communications (LIC M/C) module to couple to the first and second LIC modules and to the SCADA; wherein the first LIC module includes at least one non-transitory storage medium comprising instructions stored thereon for causing the first LIC module to: (b)(i) determine whether the first wind turbine controller module is in a lock out mode of operation that is configured to prevent restarting the first wind turbine; and (b)(ii) restart the first wind turbine in response to receiving a first command originating from the LIC M/C module; wherein the LIC M/C module is not located at the first wind turbine and the remote computing node is not located at the first wind turbine; wherein the first wind turbine controller includes at least one non-transitory storage medium comprising instructions stored thereon for causing the first wind turbine controller to restart the first wind turbine in response to receiving a second command originating from a hardware switch located at the first wind turbine.

For instance, a system may include a wind farm comprising many wind turbines. The wind turbine controller may be located within or attached to one such wind turbine. A LIC module may be adjacent the wind turbine controller. For example, the LIC module may be hardwired to the wind turbine controller via a short (e.g., less than 10 meters) length of cable.

As used herein, to "hardwire" a component is to connect (e.g., electronic components) by electrical wires or cables or to implement (a capability) through logic circuitry that is permanently connected within a computer or circuity and therefore not subject to change by programming.

As used herein, componentA being "adjacent" to componentB includes componentA being within 10 meters of componentB.

Regarding "lock out" (or "lockout") mode, 29 CFR 1910.147 provides a "Glossary of Terms Lockout Tagout". The glossary provides various definitions that guide construction of terms used herein. For example, the glossary provides the following definition: "Energy-isolating device: A mechanical device that physically prevents the transmission or release of energy, including but not limited to the following: A manually operated electrical circuit breaker; a disconnect switch; a manually operated switch by which the conductors of a circuit can be disconnected from all ungrounded supply conductors and, in addition, no pole can be operated independently; a line valve; a block; and any similar device used to block or isolate energy. Push buttons, selector switches and other control circuit type devices are not energy isolating devices." Such devices include the above mentioned "Maintenance Mode Lockout Key Switch" and "Repair Mode Lockout Key Switch". Another definition includes "Lockout: The placement of a lockout device on an energy-isolating device, in accordance with an established procedure, ensuring that the energy-isolating device and the equipment being controlled cannot be operated until the lockout device is removed." Another definition includes "Lockout device: Any device that uses positive means, such as a lock, blank flanges and bolted slip blinds, to hold an energy-isolating device in a safe position, thereby preventing the energizing of machinery or equipment." As described above, one way of determining whether a system is in "lock out" mode is to monitor a status of an energy-isolating device such as the above mentioned "disconnect switch". For example, one way of determining whether a system is in "lock out" mode is by determining whether the energy-isolating device has isolated a portion of the system from energy. However, determining whether a system is in "lock out" mode does not require, for example, the LIC module to determine whether a user followed a process or series of steps (such as affixing a "danger" tag or a lock to equipment). In an embodiment, the determination may be made by having the LIC module monitor a signal that is communicated from the lockout switch (e.g., "Maintenance Mode Lockout Key Switch" and "Repair Mode Lockout Key Switch") to the LIC. In an embodiment, if the LIC receives such a signal, the LIC will not actuate the relay switch that couples the LIC to the OEM wind turbine controller (where such a switch, when active, can communicate a signal to the wind turbine controller that will restart the wind turbine).

Regarding the "first command" mentioned above, such a command may be from HMI node 504 or from LIC M/C module 510. In an embodiment the first command may be sent from node 504 to LIC module 512 via node 510. In Example 1a, the first command may be sent to the LIC module causing the LIC module to send an additional command to the OEM (original equipment manufacturer) wind turbine controller. The additional command may include certain signals having certain pulse durations and the like that cause the wind turbine (possibly via the wind turbine controller) to start or restart.

As described above, the remote computing node may include node 504 located a half kilometer or more away from the wind turbine. The LIC M/C may be located in a command post, along with the HMI 504, a kilometer or more away from the wind turbine.

The first wind turbine controller may include code for causing the first wind turbine controller to restart the first wind turbine in response to receiving a second command originating from a hardware switch located at the first wind turbine. Such a switch may include the above mentioned "STOP/RESET" pushbutton and/or "START" pushbutton. The command may include certain signals having certain pulse durations and the like that cause the wind turbine to start or restart.

While a LIC M/C module is listed in this example, other embodiments may not include such a module or may include the functionality of the LIC M/C module into another module or node, such as node 504 of FIG. 5.

At times herein a "LIC module" is abbreviated to "LIC" and a "LIC M/C module" is abbreviated to "LIC M/C".

Regarding the LIC module "determining" whether the wind turbine controller is in lock out mode, such a determination may be direct or indirect. For instance, the LIC M/C may initially determine this status and then communicate the first command to the LIC module. Receipt of the first command may amount to the determination that the wind turbine controller is not in lock out mode.

Example 2a

The system of example 1a wherein the first LIC module couples to the first wind turbine controller module via an additional hardware switch.

Example 3a

The system of example 2a wherein: in an active state the additional hardware switch of the first LIC module is configured to communicate a third command to the first wind turbine controller module; in an inactive state the additional hardware switch of the first LIC module is prevented from communicating the third command to the first wind turbine controller module; the additional hardware switch of the first LIC module is configured to enter the active state in response to power being supplied to the hardware switch; the additional hardware switch of the first LIC module is configured to default to the inactive state in response to power being withdrawn from the hardware switch.

Example 4a

The system of example 3a wherein the additional hardware switch of the first LIC module includes an electromechanical relay switch.

Regarding Examples 2a, 3a, 4a, and 9a, the switch of example 2a may include a switch found in, for example, FIG. 13. For instance, the "magnetic field isolation" switch of FIG. 13 may have an active state when current is supplied to the illustrated coil, which in turn induces current in the circuit of the wind turbine controller. However, if power is not supplied to the switch then no current will flow in the coil and no current will be induced in the wind turbine controller. Thus, the default state would result in no current inducement. Further, if power is lost to the switch of example 2a the wind turbine controller will be unaffected or at least will be able to function in a normal manner without influence from the switch. This switch of example 2a ensures the hardware switch of example 1a is electrically isolated from the switch of example 2a.

Regarding "electric isolation", as used herein such "isolation" concerns isolating functional sections of electrical systems to prevent current flow between them. No direct conduction path is permitted. However, energy or information can still be exchanged between the sections by other means, such as capacitance, induction or electromagnetic waves, or by optical, acoustic or mechanical means. For instance, transformers couple by magnetic flux. The primary and secondary windings of a transformer are not connected to each other. While transformers are usually used to change voltages, isolation transformers with a 1:1 ratio are used in safety applications. Opto-isolators transmit information by light waves. The sender (light source) and receiver (photosensitive device) are not electrically connected. Hall effect sensors allow an inductor to transfer information across a small gap magnetically. Optocouplers may be used within a system to decouple a function block from another function block that is connected to the power grid or other high voltage. Doing so provides for safety and equipment protection.

Example 5a

The system of example 3a wherein: the first wind turbine controller module comprises input/output (I/O) ports; the first LIC module does not couple to any of the I/O ports.

Thus, as mentioned above, the wind turbine controller may have I/O ports and may even have unassigned I/O ports. However, communicatively coupling the LIC module to such an I/O port elevates the risk that at a later time the I/O port may be assigned by the wind turbine controller manufacturer, who may not know about the LIC module. Such a situation may cause a conflict and prevent the LIC module from remotely restarting a turbine.

Example 6a

The system of example 3a comprising: another hardware switch located at the first wind turbine; wherein in an active state the another hardware switch located at the first wind turbine is configured to prevent restarting the first wind turbine independently of whether the additional hardware switch is in the active state.

For example, this "another switch" may include the above mentioned "Maintenance Mode Lockout Key Switch" and/ or "Repair Mode Lockout Key Switch". If the lock out switch is in lockout mode, then the LIC module switch of Example 2a will be unable to restart the wind turbine.

Example 7a

The system of example 2a wherein the first wind turbine controller module is configured to restart the first wind turbine independently of whether the additional hardware switch of the first LIC module is in the active state.

For instance, the hardware switch of Example 1a may include the above mentioned "STOP/RESET" button or "START" button. Such a button may restart the wind turbine regardless of whether the switch of Example 2a is active or inactive.

Example 8a

The system of example 2a wherein: the at least one non-transitory storage medium of the first LIC module comprises instructions to cause the first LIC module to restart the first wind turbine in response to the first LIC module communicating a third command to the hardware switch; the third command includes at least one of the first command, the second command, or an additional command.

Thus, examples 1a, 2a, and 3a collectively address first, second, and third commands. The first command may be from HDI 504 (and/or LIC M/C module 510) to LIC module 512. The second command may be from the STOP/RESET or START button to the wind turbine controller. The third command may be from the LIC to the hardware switch of example 2a. The third command may be from the hardware switch of example 2a to the wind turbine controller. For instance, once switch of example 2a is in the active state a signal may be sent to the switch from the LIC and that signal may pass through the active switch on continue on to the wind turbine controller. The third command may be different from the second command or may exactly mimic the second command. For instance, the second and third commands may share the same signal sequence, pulse duration, signal timing, and the like.

Another version of Example 8a. The system of example 2a wherein: the at least one non-transitory storage medium of the first LIC module comprises instructions to cause the first LIC module to restart the first wind turbine in response to the first LIC module communicating a third command to the hardware switch; the third command mimics the second command.

For instance, the second and third commands may share the same signal sequence, pulse duration, signal timing, and the like. In an embodiment, the second and third signals may both interface the wind turbine controller at the same port.

Example 9a

The system of example 2a wherein the hardware switch located at the first wind turbine is electrically isolated from the additional hardware switch of the first LIC module.

Another version of Example 9a. The system of example 2a wherein the additional hardware switch of the first LIC module electrically isolates first LIC module from the first wind turbine controller.

For instance, in an embodiment the additional hardware switch of the LIC module may include an isolation coil such that hardware switch is essentially isolated into two portions. A first of the two portions couples to the wind turbine controller and a second of the two portions couples to the LIC module. As a result, the switch isolates LIC module from the wind turbine controller.

Example 10a

The system of example 1a wherein the LIC M/C module includes at least one non-transitory storage medium comprising instructions stored thereon for causing the LIC M/C module to: determine the first wind turbine is not rotating; and determine the second wind turbine is rotating.

Example 11a

The system of example 10a wherein the at least one non-transitory storage medium of the LIC M/C module comprises instructions to cause the LIC M/C module to generate the first command in response to the LIC M/C module determining the first wind turbine is not rotating.

Regarding Examples 10a and 11a, in an embodiment the LIC M/C module may monitor the status of multiple turbines (e.g., whether the turbines are rotating and generating power). Upon determining a turbine is in some form of error state, the LIC M/C module may generate the first command of example 1a. Thus, a restart command of some sort may originate from a HDI in response to a user input. However, in other embodiments the restart command may be automated.

Another version of example 10a. The system of example 1a wherein the LIC M/C module includes at least one non-transitory storage medium comprising instructions stored thereon for causing the LIC M/C module to: determine the first wind turbine is in an error state; and determine the second wind turbine is not in an error state.

Another version of example 11a. The system of example 10a wherein the at least one non-transitory storage medium of the LIC M/C module comprises instructions to cause the LIC M/C module to generate the first command in response to the LIC M/C module determining the first wind turbine is in an error state.

For instance, in some cases a failure for a turbine to rotate may be on purpose (e.g., because an energy grid cannot accommodate power from the turbine). Thus, as shown in the GUI of FIG. 8, an error state may be determined for turbine B25 but not for B24. In response, the LIC M/C may attempt to restart turbine B25.

Example 12a

The system of example 1a comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module.

For instance, the first command of example 1a may go from the HDI node 504 to the LIC module 512 via the LIC M/C module 510 (or may bypass module 510 or, in some cases, module 510 may not be included in the embodiment).

Example 13a

The system of example 12a wherein the at least one non-transitory medium of the remote computing node comprises instructions to cause the remote computing node to communicate the first command from the remote computing node to the first LIC module in response to user input entered via the remote computing node.

For instance, a user may tap a screen at HDI node 504 to generate the first command of example 1a.

Example 14a

The system of example 1a comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module while avoiding communicating the first command from the remote computing node to the second LIC module.

For instance, a user may tap a screen at HDI node 504 to generate the first command of example 1a. This action may be made on a turbine by turbine basis instead of a batch command where the first command of example 1a is indiscriminately sent to all turbines in a group of turbines.

Example 15a

The system of example 1a wherein: the at least one non-transitory storage medium of the first LIC includes a first non-transitory storage medium; the at least one non-transitory storage medium of the first wind turbine controller includes a second non-transitory storage medium; the first non-transitory storage medium is not monolithic with the second non-transitory storage medium.

For instance, an advantage of an embodiment is that code (or logic) for the LIC module is not comingled with code for OEM's windmill controller. For example, code for the LIC module may be on a first die (e.g., a memory die) while code for the windmill controller is stored in a second die. The first die and the second die may not be located on the same substrate. For example, the first die may be mounted on a first package substrate along with a processor for the LIC module. The second die may be mounted on a second package substrate along with a processor for the windmill controller. The two packages may be separate from one another.

Example 16a

The system of example 1a wherein the first wind turbine controller module includes at least one non-transitory storage medium comprising instructions stored thereon for causing the first wind turbine controller module to restart the first wind turbine independently of the first command.

For instance, the hardware switch of Example 1a may include the above mentioned "STOP/RESET" button or "START" button. Such a button may restart the wind turbine regardless of whether the switch of Example 2a is active or inactive or regardless of whether the first command is ever generated by a node or received by the LIC module. Thus, inoperability of the LIC module will not stop the normal operation of the windmill controller whereby a user can actuate the "STOP/RESET" button or "START" button to restart the turbine.

Example 17a

A method comprising: hardwiring a first local intervention controller (LIC) module to a first wind turbine controller module, wherein the first wind turbine controller module is located at a first wind turbine; hardwiring a second LIC module to a second wind turbine controller module, wherein the second wind turbine controller module is located at a second wind turbine; configuring the first LIC module to determine whether the first wind turbine controller module is in a lock out mode of operation that is configured to prevent restarting the first wind turbine; configuring the first LIC module to restart the first wind turbine in response to the first LIC module receiving a first command originating from a computing node; actuating a hardware switch located at the first wind turbine to restart the first wind turbine via the first wind turbine controller.

For example, such a method may be described in an installation check list that a field technician uses when installing an LIC module.

Example 18a

The method of example 17a comprising: disconnecting the first LIC module from power; restarting the first wind turbine while the first LIC module is disconnected from power.

Example 19a

The method of example 17a comprising: placing the first wind turbine controller module in the lock out mode of operation; unsuccessfully attempting to restart the first wind turbine via the first LIC module while the first wind turbine controller module is in the lock out mode of operation.

Example 20a

A system comprising: a local intervention controller (LIC) module; a hardware switch coupled to the LIC module, wherein the hardware switch is configured to couple the LIC module to a wind turbine controller module via a hardwire connection; an input/out (I/O) port included in the LIC module, wherein the I/O port is configured to interface a supervisory control and data acquisition (SCADA) control system; wherein the LIC module includes at least one non-transitory storage medium comprising instructions stored thereon for causing the LIC module to: (a) determine whether the wind turbine controller module is in a lock out mode of operation that is configured to prevent restarting a wind turbine; and (b) restart the wind turbine in response to receiving a first command originating from a computing node.

For instance, while example 1a addresses a large system including a SCADA, other embodiments include discreet systems such as the LIC module. Thus, an embodiment includes the LIC module by itself and/or code or logic for the LIC module. Such an embodiment may be shipped in a box to a location where a field technician opens the box and installs the LIC module.

An additional version of Example 20a. A system comprising: a local intervention controller (LIC) module; a hardware switch coupled to the LIC module, wherein the hardware switch is configured to couple the LIC module to a wind turbine controller module; an input/out (I/O) port included in the LIC module, wherein the I/O port is configured to interface a supervisory control and data acquisition (SCADA) control system; wherein the LIC module includes at least one non-transitory storage medium comprising instructions stored thereon for causing the LIC module to: (a) determine whether the wind turbine controller module is in a lock out mode of operation that is configured to prevent restarting a wind turbine; and (b) restart the wind turbine in response to receiving a first command originating from a computing node.

An additional version of Example 20a. A system comprising: a local intervention controller (LIC) module; an input/out (I/O) port included in the LIC module, wherein the I/O port is configured to interface a supervisory control and data acquisition (SCADA) control system; wherein the LIC module includes at least one non-transitory storage medium comprising instructions stored thereon for causing the LIC module to: (a) determine whether the wind turbine controller module is in a lock out mode of operation that is configured to prevent restarting a wind turbine; and (b) restart the wind turbine in response to receiving a first command originating from a computing node.

Example 21a

The system of example 20a wherein: in an active state the hardware switch is configured to communicate a second command to the wind turbine controller module; in an inactive state the hardware switch is prevented from communicating the second command to the wind turbine controller module; the hardware switch is configured to enter the active state in response to power being supplied to the hardware switch; the hardware switch is configured to default to the inactive state in response to power being withdrawn from the hardware switch.

Example 22a

The system of example 20a wherein the hardware switch is configured to electrically isolate the LIC module from the wind turbine controller module.

Example 20b

A system comprising: a local intervention controller (LIC) module; a hardware switch coupled to the LIC module, wherein the hardware switch is configured to couple the LIC module to an energy generation controller module via a hardwire connection; an input/out (I/O) port included in the LIC module, wherein the I/O port is configured to interface a supervisory control and data acquisition (SCADA) control system; wherein the LIC module includes at least one non-transitory storage medium comprising instructions stored thereon for causing the LIC module to: (a) determine whether the energy generation controller module is in a lock out mode of operation; and (b) restart an energy generation module (e.g., hydroelectric turbine) in response to receiving a first command originating from a computing node.

Thus, an LIC module is as applicable to a hydroelectric application as it is to a solar application or a wind turbine application.

Example 21b

The system of example 20b wherein: in an active state the hardware switch is configured to communicate a second command to the energy generation controller module; in an inactive state the hardware switch is prevented from communicating the second command to the energy generation controller module; the hardware switch is configured to enter the active state in response to power being supplied to the hardware switch; the hardware switch is configured to default to the inactive state in response to power being withdrawn from the hardware switch.

Example 22b

The system of example 20b wherein the hardware switch is configured to electrically isolate the LIC module from the energy generation controller module.

Example 1b

A system comprising: a first energy generation controller module located at a first energy generation module; a second energy generation controller module located at a second energy generation module; a first local intervention controller (LIC) module located adjacent to the first energy generation controller module; a second LIC module located adjacent to the second energy generation controller module; a supervisory control and data acquisition (SCADA) control system coupled to: (a)(i) the first and second energy generation controller modules, and (a)(ii) the first and second LIC modules; an LIC monitoring and communications (LIC M/C) module coupled to the first and second LIC modules and to the SCADA; wherein the first LIC module includes at least one non-transitory storage medium comprising instructions stored thereon for causing the first LIC module to: (b)(i) determine whether the first energy generation controller module is in a lock out mode of operation that is configured to prevent restarting the first energy generation module; and (b)(ii) restart the first energy generation module in response to receiving a first command originating from at least one of the LIC M/C module or a remote computing node; wherein the LIC M/C module is not located at the first energy generation module and the remote computing node is not located at the first energy generation module; wherein the first energy generation controller includes at least one non-transitory storage medium comprising instructions stored thereon for causing the first wind turbine controller to restart the first energy generation module in response to receiving a second command originating from a hardware switch located at the first energy generation module.

Example 2b

The system of example 1b wherein the first LIC module couples to the first energy generation controller module via an additional hardware switch.

Example 3b

The system of example 2b wherein: in an active state the additional hardware switch of the first LIC module is configured to communicate a third command to the first energy generation controller module; in an inactive state the additional hardware switch of the first LIC module is prevented from communicating the third command to the first wind turbine controller module; the additional hardware switch of the first LIC module is configured to enter the active state in response to power being supplied to the hardware switch; the additional hardware switch of the first LIC module is configured to default to the inactive state in response to power being withdrawn from the hardware switch.

Example 4b

The system of example 3b wherein the additional hardware switch of the first LIC module includes an electromechanical relay switch.

Example 5b

The system of example 3b wherein: the first energy generation controller module comprises input/output (I/O) ports; the first LIC module does not couple to any of the I/O ports.

Example 6b

The system of example 3b comprising: another hardware switch located at the first energy generation module; wherein in an active state the another hardware switch located at the first energy generation module is configured to prevent restarting the first energy generation module independently of whether the additional hardware switch is in the active state.

Example 7b

The system of example 2b wherein the first energy generation controller module is configured to restart the first energy generation module independently of whether the additional hardware switch of the first LIC module is in the active state.

Example 8b

The system of example 2b wherein: the at least one non-transitory storage medium of the first LIC module comprises instructions to cause the first LIC module to restart the first energy generation module in response to the first LIC module communicating a third command to the hardware switch; the third command includes at least one of the first command, the second command, or an additional command.

Example 9b

The system of example 2b wherein the hardware switch located at the first energy generation module is electrically isolated from the additional hardware switch of the first LIC module.

Example 10b

The system of example 1b wherein the LIC M/C module includes at least one non-transitory storage medium comprising instructions stored thereon for causing the LIC M/C module to: determine the first energy generation module is not rotating; and determine the second energy generation module is rotating.

Example 11b

The system of example 10b wherein the at least one non-transitory storage medium of the LIC M/C module comprises instructions to cause the LIC M/C module to generate the first command in response to the LIC M/C module determining the first energy generation module is not rotating.

Example 12b

The system of example 1b comprising the remote computing node and a display coupled to the remote computing node, wherein: the remote computing node is located more than 0.5 kilometers from the first energy generation module; the remote computing node includes at least one non-transitory storage medium comprising instructions stored thereon for causing the remote computing node to communicate the first command from the remote computing node to the first LIC module.

Example 13b

The system of example 12b wherein the at least one non-transitory medium of the remote computing node comprises instructions to cause the remote computing node to communicate the first command from the remote computing node to the first LIC module in response to user input entered via the remote computing node.

Example 14b

The system of example 1b comprising the remote computing node and a display coupled to the remote computing node, wherein: the remote computing node is located more than 0.5 kilometers from the first energy generation module; the remote computing node includes at least one non-transitory storage medium comprising instructions stored thereon for causing the remote computing node to communicate the first command from the remote computing node to the first LIC module while avoiding communicating the first command from the remote computing node to the second LIC module.

Example 15b

The system of example 1b wherein: the at least one non-transitory storage medium of the first LIC includes a first non-transitory storage medium; the at least one non-transitory storage medium of the first energy generation module controller includes a second non-transitory storage medium; the first non-transitory storage medium is not monolithic with the second non-transitory storage medium.

Example 16b

The system of example 1b wherein the first energy generation controller module includes at least one non-transitory storage medium comprising instructions stored thereon for causing the first energy generation controller module to restart the first energy generation module independently of the first command.

Example 1c

A system comprising: a first wind turbine controller module located at a first wind turbine; a second wind turbine controller module located at a second wind turbine; a first local intervention controller (LIC) module to couple to the first wind turbine controller module; a second LIC module to couple to the second wind turbine controller module; a supervisory control and data acquisition (SCADA) control system to couple to: (a)(i) the first and second wind turbine controller modules, and (a)(ii) the first and second LIC modules; an LIC monitoring and communications (LIC M/C) module to couple to the first and second LIC modules and to the SCADA; wherein the first LIC module includes at least one non-transitory storage medium comprising instructions stored thereon for causing the first LIC module to: (b)(i) determine whether the first wind turbine controller module is in a lock out mode of operation that is configured to prevent restarting the first wind turbine; and (b)(ii) restart the first wind turbine in response to receiving a first command originating from at least one of the LIC M/C module or a remote computing node; wherein the LIC M/C module is not located at the first wind turbine and the remote computing node is not located at the first wind turbine; wherein the first wind turbine controller includes at least one non-transitory storage medium comprising instructions stored thereon for causing the first wind turbine controller to restart the first wind turbine in response to receiving a second command originating from a hardware switch located at the first wind turbine.

Example 2c

The system of example 1c wherein the first LIC module couples to the first wind turbine controller module via an additional hardware switch.

Example 3c

The system of example 2c wherein: in an active state the additional hardware switch of the first LIC module is configured to communicate a third command to the first wind turbine controller module; in an inactive state the additional hardware switch of the first LIC module is prevented from communicating the third command to the first wind turbine controller module; the additional hardware switch of the first LIC module is configured to enter the active state in response to power being supplied to the hardware switch; the additional hardware switch of the first LIC module is configured to default to the inactive state in response to power being withdrawn from the hardware switch.

Example 4c

The system according to any of examples 2c to 3c wherein the additional hardware switch of the first LIC module includes an electro-mechanical relay switch.

Example 5c

The system according to any of examples 1c to 4c wherein: the first wind turbine controller module comprises input/output (I/O) ports; the first LIC module does not communicatively couple to any of the I/O ports.

Example 6c

The system according to any of examples 1c to 5c comprising: another hardware switch located at the first wind turbine; wherein in an active state the another hardware switch located at the first wind turbine is configured to prevent restarting the first wind turbine independently of whether the additional hardware switch is in the active state.

Example 7c

The system according to any of examples 2c to 6c wherein the first wind turbine controller module is configured to restart the first wind turbine independently of whether the additional hardware switch of the first LIC module is in the active state.

Example 8c

The system according to any of examples 3c to 7c wherein: the at least one non-transitory storage medium of the first LIC module comprises instructions to cause the first LIC module to restart the first wind turbine in response to the first LIC module communicating a third command to the hardware switch; the third command includes at least one of the first command, the second command, or an additional command.

Example 9c

The system according to any of examples 2c to 8c wherein the hardware switch located at the first wind turbine is electrically isolated from the additional hardware switch of the first LIC module.

Example 10c

The system according to any of examples 1c to 9c wherein the LIC M/C module includes at least one non-transitory storage medium comprising instructions stored thereon for causing the LIC M/C module to: determine the first wind turbine is not rotating; and determine the second wind turbine is rotating.

Example 11c

The system of example 10c wherein the at least one non-transitory storage medium of the LIC M/C module comprises instructions to cause the LIC M/C module to generate the first command in response to the LIC M/C module determining the first wind turbine is not rotating.

Example 12c

The system according to any of examples 1c to 11c comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module.

Example 13c

The system of claim 12c wherein the at least one non-transitory medium of the remote computing node comprises instructions to cause the remote computing node to communicate the first command from the remote computing node to the first LIC module in response to user input entered via the remote computing node.

Example 14c

The system according to any of examples 1c to 13c comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module while avoiding communicating the first command from the remote computing node to the second LIC module.

Example 15c

The system according to any of examples 1c to 14c wherein: the at least one non-transitory storage medium of the first LIC includes a first non-transitory storage medium; the at least one non-transitory storage medium of the first wind turbine controller includes a second non-transitory storage medium; the first non-transitory storage medium is not monolithic with the second non-transitory storage medium.

Example 16c

The system according to any of examples 1c to 15c wherein the first wind turbine controller module includes at least one non-transitory storage medium comprising instructions stored thereon for causing the first wind turbine controller module to restart the first wind turbine independently of the first command.

Example 17c

A method comprising: hardwiring a first local intervention controller (LIC) module to a first wind turbine controller module, wherein the first wind turbine controller module is located at a first wind turbine; hardwiring a second LIC module to a second wind turbine controller module, wherein the second wind turbine controller module is located at a second wind turbine; configuring the first LIC module to determine whether the first wind turbine controller module is in a lock out mode of operation that is configured to prevent restarting the first wind turbine; configuring the first LIC module to restart the first wind turbine in response to the first LIC module receiving a first command originating from a computing node; actuating a hardware switch in response to the first LIC module: (a) determining the first wind turbine controller module is not in the lock out mode of operation, and (b) receiving the first command, wherein the hardware switch is coupled to the first LIC module; restarting the first wind turbine in response to actuating the hardware switch.

Example 18c

The method of example 17c comprising: disconnecting the first LIC module from power; restarting the first wind turbine while the first LIC module is disconnected from power.

Example 19c

The method according to any of examples 17c to 18c comprising: placing the first wind turbine controller module in the lock out mode of operation; unsuccessfully attempting to restart the first wind turbine via the first LIC module while the first wind turbine controller module is in the lock out mode of operation.

Example 20c

A system comprising: a local intervention controller (LIC) module; a hardware switch coupled to the LIC module, wherein the hardware switch is configured to couple the LIC module to a wind turbine controller module via a hardwire connection; an input/out (I/O) port included in the LIC module, wherein the I/O port is configured to interface a supervisory control and data acquisition (SCADA) control system; wherein the LIC module includes at least one non-transitory storage medium comprising instructions stored thereon for causing the LIC module to: (a) determine whether the wind turbine controller module is in a lock out mode of operation that is configured to prevent restarting a wind turbine; and (b) restart the wind turbine in response to receiving a first command originating from a computing node.

Example 21c

The system of example 20c wherein: in an active state the hardware switch is configured to communicate a second command to the wind turbine controller module; in an inactive state the hardware switch is prevented from communicating the second command to the wind turbine controller module; the hardware switch is configured to enter the active state in response to power being supplied to the hardware switch; the hardware switch is configured to default to the inactive state in response to power being withdrawn from the hardware switch.

Example 22c

The system according to any of examples 20c to 21c wherein the hardware switch is configured to electrically isolate the LIC module from the wind turbine controller module.

Example 1d

A system comprising: a first wind turbine controller module located at a first wind turbine; a second wind turbine controller module located at a second wind turbine; a first local intervention controller (LIC) module to couple to the first wind turbine controller module; a second LIC module to couple to the second wind turbine controller module; a supervisory control and data acquisition (SCADA) control system to couple to: (a)(i) the first and second wind turbine controller modules, and (a)(ii) the first and second LIC modules; an LIC monitoring and communications (LIC M/C) module to couple to the first and second LIC modules and to the SCADA; wherein the first LIC module includes at least one non-transitory storage medium comprising instructions stored thereon for causing the first LIC module to: (b)(i) determine whether the first wind turbine controller module is in a lock out mode of operation that is configured to prevent restarting the first wind turbine; and (b)(ii) restart the first wind turbine in response to receiving a first command originating from at least one of the LIC M/C module or a remote computing node; wherein the LIC M/C module is not located at the first wind turbine and the remote computing node is not located at the first wind turbine; wherein the first wind turbine controller includes at least one non-transitory storage medium comprising instructions stored thereon for causing the first wind turbine controller to restart the first wind turbine in response to receiving a second command originating from a hardware switch located at the first wind turbine.

Example 2d

The system of example 1d wherein the first LIC module couples to the first wind turbine controller module via an additional hardware switch.

Example 3d

The system of example 2d wherein: in an active state the additional hardware switch of the first LIC module is configured to communicate a third command to the first wind turbine controller module; in an inactive state the additional hardware switch of the first LIC module is prevented from communicating the third command to the first wind turbine controller module; the additional hardware switch of the first LIC module is configured to enter the active state in response to power being supplied to the hardware switch; the additional hardware switch of the first LIC module is configured to default to the inactive state in response to power being withdrawn from the hardware switch.

Example 4d

The system according to any of examples 2d-3d wherein the additional hardware switch of the first LIC module includes an electro-mechanical relay switch.

Example 5d

The system according to any of examples 1d-5d wherein: the first wind turbine controller module comprises input/ output (I/O) ports; the first LIC module does not communicatively couple to any of the I/O ports.

Example 6d

The system according to any of examples 2d-6d comprising: another hardware switch located at the first wind turbine; wherein in an active state the another hardware switch located at the first wind turbine is configured to prevent restarting the first wind turbine independently of whether the additional hardware switch is in the active state.

Example 7d

The system according to any of examples 2d-6d wherein the first wind turbine controller module is configured to restart the first wind turbine independently of whether the additional hardware switch of the first LIC module is in the active state.

Example 8d

The system according to any of examples 3d-7d wherein: the at least one non-transitory storage medium of the first LIC module comprises instructions to cause the first LIC module to restart the first wind turbine in response to the first LIC module communicating a third command to the hardware switch; the third command mimics the second command.

Example 9d

The system according to any of examples 2d-8d wherein the additional hardware switch of the first LIC module electrically isolates first LIC module from the first wind turbine controller'

Example 10d

The system according to any of examples 1d-9d wherein the LIC M/C module includes at least one non-transitory storage medium comprising instructions stored thereon for causing the LIC M/C module to: determine the first wind turbine is in an error state; and determine the second wind turbine is not in an error state.

Example 11d

The system of example 10d wherein the at least one non-transitory storage medium of the LIC M/C module comprises instructions to cause the LIC M/C module to generate the first command in response to the LIC M/C module determining the first wind turbine is in an error state.

Example 12d

The system according to any of examples 1d-11d comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module.

Example 13d

The system of example 12d wherein the at least one non-transitory medium of the remote computing node comprises instructions to cause the remote computing node to communicate the first command from the remote computing node to the first LIC module in response to user input entered via the remote computing node.

Example 14d

The system according to any of examples 1d-13d comprising the remote computing node and a display coupled to the remote computing node, wherein: the remote computing node is located more than 0.5 kilometers from the first wind turbine; the remote computing node includes at least one non-transitory storage medium comprising instructions stored thereon for causing the remote computing node to communicate the first command from the remote computing node to the first LIC module while avoiding communicating the first command from the remote computing node to the second LIC module.

Example 15d

The system according to any of examples 1d-14d wherein: the at least one non-transitory storage medium of the first LIC includes a first non-transitory storage medium; the at least one non-transitory storage medium of the first wind turbine controller includes a second non-transitory storage medium; the first non-transitory storage medium is not monolithic with the second non-transitory storage medium.

Example 16d

The system according to any of examples 1d-15d wherein the first wind turbine controller module includes at least one non-transitory storage medium comprising instructions stored thereon for causing the first wind turbine controller module to restart the first wind turbine independently of the first command.

Example 17d

A method comprising: hardwiring a first local intervention controller (LIC) module to a first wind turbine controller module, wherein the first wind turbine controller module is located at a first wind turbine; hardwiring a second LIC module to a second wind turbine controller module, wherein the second wind turbine controller module is located at a second wind turbine; configuring the first LIC module to determine whether the first wind turbine controller module is in a lock out mode of operation that is configured to prevent restarting the first wind turbine; configuring the first LIC module to restart the first wind turbine in response to the first LIC module receiving a first command originating from a computing node; actuating a hardware switch in response to the first LIC module: (a) determining the first wind turbine controller module is not in the lock out mode of operation, and (b) receiving the first command, wherein the hardware switch is coupled to the first LIC module; restarting the first wind turbine in response to actuating the hardware switch.

Example 18d

The method of example 17d comprising: disconnecting the first LIC module from power; restarting the first wind turbine while the first LIC module is disconnected from power.

Example 19d

The method according to any of examples 17d-18d comprising: placing the first wind turbine controller module in the lock out mode of operation; unsuccessfully attempting to restart the first wind turbine via the first LIC module while the first wind turbine controller module is in the lock out mode of operation.

Example 20d

A system comprising: a local intervention controller (LIC) module; a hardware switch coupled to the LIC module, wherein the hardware switch is configured to couple the LIC module to a wind turbine controller module via a hardwire connection; an input/out (I/O) port included in the LIC module, wherein the I/O port is configured to interface a supervisory control and data acquisition (SCADA) control system; wherein the LIC module includes at least one non-transitory storage medium comprising instructions stored thereon for causing the LIC module to: (a) determine whether the wind turbine controller module is in a lock out mode of operation that is configured to prevent restarting a wind turbine; and (b) restart the wind turbine in response to receiving a first command originating from a computing node.

Example 21d

The system of example 20d wherein: in an active state the hardware switch is configured to communicate a second command to the wind turbine controller module; in an inactive state the hardware switch is prevented from communicating the second command to the wind turbine controller module; the hardware switch is configured to enter the active state in response to power being supplied to the hardware switch; the hardware switch is configured to default to the inactive state in response to power being withdrawn from the hardware switch.

Example 22d

The system according to any of examples 20d-21d wherein the hardware switch is configured to electrically isolate the LIC module from the wind turbine controller module.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system comprising:
   a first wind turbine controller module located at a first wind turbine;
   a second wind turbine controller module located at a second wind turbine;
   a first local intervention controller (LIC) module to couple to the first wind turbine controller module;
   a second LIC module to couple to the second wind turbine controller module;
   a supervisory control and data acquisition (SCADA) control system to couple to: (a)(i) the first and second wind turbine controller modules, and (a)(ii) the first and second LIC modules;
   an LIC monitoring and communications (LIC M/C) module to couple to the first and second LIC modules and to the SCADA;
   wherein the first LIC module includes at least one non-transitory storage medium comprising instructions stored thereon for causing the first LIC module to:

(b)(i) determine whether the first wind turbine controller module is in a lock out mode of operation, the lock out mode of operation being both: (b)(i)(1) configured to prevent restarting the first wind turbine and, (b)(i)(2) based on a manually operated electrical circuit breaker; and (b)(ii) restart the first wind turbine in response to receiving a first command originating from at least one of the LIC M/C module or a remote computing node;

wherein the LIC M/C module is not located at the first wind turbine and the remote computing node is not located at the first wind turbine;

wherein the first wind turbine controller includes at least one non-transitory storage medium comprising instructions stored thereon for causing the first wind turbine controller to restart the first wind turbine in response to receiving a second command originating from a hardware switch located at the first wind turbine;

wherein the hardware switch includes at least one of a manually selectable setting to stop the first wind turbine or a manually selectable start setting to start the first wind turbine;

wherein the at least one non-transitory storage medium of the first LIC module further comprises instructions to cause the first LIC module to restart the first wind turbine in response to the first LIC module communicating a third command to the hardware switch;

wherein the third command equals at least a portion of the second command;

wherein: (a) the first LIC module couples to the first wind turbine controller module via an additional hardware switch, (b) in an on state the additional hardware switch of the first LIC module is configured to communicate the third command to the first wind turbine controller module; (c) in an off state the additional hardware switch of the first LIC module is prevented from communicating the third command to the first wind turbine controller module; (d) the additional hardware switch of the first LIC module is configured to enter the on state in response to power being supplied to the additional hardware switch; (e) the additional hardware switch of the first LIC module is configured to default to the off state in response to power being withdrawn from the additional hardware switch.

2. The system of claim 1 wherein the additional hardware switch of the first LIC module includes an electro-mechanical relay switch.

3. The system of claim 1 wherein:
the first wind turbine controller module comprises input/output (I/O) ports;
the first LIC module does not communicatively couple to any of the I/O ports.

4. The system of claim 1 comprising:
the manually operated electrical circuit breaker, which is located at the first wind turbine;
wherein in an on state the manually operated electrical circuit breaker located at the first wind turbine is configured to prevent restarting the first wind turbine independently of whether the additional hardware switch is in the on state.

5. The system of claim 1 wherein the first wind turbine controller module is configured to restart the first wind turbine independently of whether the additional hardware switch of the first LIC module is in the on state.

6. The system of claim 1 wherein:
the additional hardware switch of the first LIC module is to electrically isolate the first LIC module from the first wind turbine controller;

no direct conduction path exists between opposing sides of the additional hardware switch when the additional hardware switch is in the on state.

7. The system of claim 1 wherein the LIC M/C module includes at least one non-transitory storage medium comprising instructions stored thereon for causing the LIC M/C module to:
determine the first wind turbine is in an error state; and
determine the second wind turbine is not in an error state.

8. The system of claim 7 wherein the at least one non-transitory storage medium of the LIC M/C module comprises instructions to cause the LIC M/C module to generate the first command in response to the LIC M/C module determining the first wind turbine is in an error state.

9. The system of claim 1 comprising the remote computing node and a display coupled to the remote computing node, wherein:
the remote computing node is located more than 0.5 kilometers from the first wind turbine;
the remote computing node includes at least one non-transitory storage medium comprising instructions stored thereon for causing the remote computing node to communicate the first command from the remote computing node to the first LIC module.

10. The system of claim 9 wherein the at least one non-transitory medium of the remote computing node comprises instructions to cause the remote computing node to communicate the first command from the remote computing node to the first LIC module in response to user input entered via the remote computing node.

11. The system of claim 1 comprising the remote computing node and a display coupled to the remote computing node, wherein:
the remote computing node is located more than 0.5 kilometers from the first wind turbine;
the remote computing node includes at least one non-transitory storage medium comprising instructions stored thereon for causing the remote computing node to communicate the first command from the remote computing node to the first LIC module while avoiding communicating the first command from the remote computing node to the second LIC module.

12. A method comprising:
hardwiring a first local intervention controller (LIC) module to a first wind turbine controller module, wherein the first wind turbine controller module is located at a first wind turbine;
hardwiring a second LIC module to a second wind turbine controller module, wherein the second wind turbine controller module is located at a second wind turbine;
configuring the first LIC module to determine whether the first wind turbine controller module is in a lock out mode of operation that is configured to prevent restarting the first wind turbine, wherein whether the first wind turbine controller module is in a lock out mode of operation is based on a manually operated electrical circuit breaker;
configuring the first LIC module to restart the first wind turbine in response to the first LIC module receiving a first command originating from a computing node;
actuating a hardware switch in response to the first LIC module: (a) determining the first wind turbine controller module is not in the lock out mode of operation, and (b) receiving the first command, wherein the hardware switch is coupled to the first LIC module;
restarting the first wind turbine in response to actuating the hardware switch;

wherein: (a) in an on state the hardware switch is configured to communicate a second command to the wind turbine controller module; (b) in an off state the hardware switch is prevented from communicating the second command to the wind turbine controller module;

wherein the first wind turbine controller module includes at least one non-transitory storage medium comprising instructions stored thereon for causing the first wind turbine controller module to restart the first wind turbine in response to receiving a third command originating from an additional hardware switch located at the first wind turbine;

wherein the second command equals at least a portion of the third command.

13. The method of claim 12 comprising:
disconnecting the first LIC module from power;
restarting the first wind turbine while the first LIC module is disconnected from power.

14. The method of claim 12 comprising:
placing the first wind turbine controller module in the lock out mode of operation;
unsuccessfully attempting to restart the first wind turbine via the first LIC module while the first wind turbine controller module is in the lock out mode of operation.

15. A system comprising:
a local intervention controller (LIC) module;
a hardware switch coupled to the LIC module, wherein the hardware switch is configured to couple the LIC module to a wind turbine controller module via a hardwire connection;
an input/out (I/O) port included in the LIC module, wherein the I/O port is configured to interface a supervisory control and data acquisition (SCADA) control system;
wherein the LIC module includes at least one non-transitory storage medium comprising instructions stored thereon for causing the LIC module to: (a) determine whether the wind turbine controller module is in a lock out mode of operation, the lock out mode of operation being both: (a)(i) configured to prevent restarting a wind turbine, and (a)(ii) based on a manually operated electrical circuit breaker; and (b) restart the wind turbine in response to receiving a first command originating from a computing node;

wherein: (a) in an on state the hardware switch is configured to communicate a second command to the wind turbine controller module; (b) in an off state the hardware switch is prevented from communicating the second command to the wind turbine controller module; (c) the hardware switch is configured to enter the on state in response to power being supplied to the hardware switch; (d) the hardware switch is configured to default to the off state in response to power being withdrawn from the hardware switch;

wherein the wind turbine controller module includes at least one non-transitory storage medium comprising instructions stored thereon for causing the wind turbine controller module to restart the wind turbine in response to receiving a third command originating from an additional hardware switch located at the wind turbine;

wherein the second command equals at least a portion of the third command.

16. The system of claim 15 wherein:
the hardware switch is configured to electrically isolate the LIC module from the wind turbine controller module;
no direct conduction path exists between opposing sides of the hardware switch when the hardware switch is in the on state.

17. The system of claim 1 wherein:
the portion of the second command includes a characteristic of the second command;
the characteristic includes at least one of signal sequence, pulse duration, signal timing, or combinations thereof.

18. The system of claim 1 wherein the portion of the second command includes pulse duration.

19. The system of claim 15 comprising:
the wind turbine controller module;
the additional hardware switch;
the at least one non-transitory storage medium comprising instructions stored thereon for causing the wind turbine controller module to restart the wind turbine in response to receiving the third command originating from the additional hardware switch.

20. The system of claim 15 wherein the hardware switch includes an electro-mechanical relay switch.

21. The method of claim 12 wherein the hardware switch includes an electro-mechanical relay switch.

* * * * *